(12) United States Patent
Sole Rojals et al.

(10) Patent No.: US 9,936,200 B2
(45) Date of Patent: Apr. 3, 2018

(54) RICE PARAMETER UPDATE FOR COEFFICIENT LEVEL CODING IN VIDEO CODING PROCESS

(71) Applicant: QUALCOMM Incorporated, San Diego, CA (US)

(72) Inventors: Joel Sole Rojals, La Jolla, CA (US); Marta Karczewicz, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 672 days.

(21) Appl. No.: 14/250,282

(22) Filed: Apr. 10, 2014

(65) Prior Publication Data

US 2014/0307800 A1 Oct. 16, 2014

Related U.S. Application Data

(60) Provisional application No. 61/811,632, filed on Apr. 12, 2013, provisional application No. 61/832,652, (Continued)

(51) Int. Cl.
*H04N 19/91* (2014.01)
*H04N 19/13* (2014.01)
(Continued)

(52) U.S. Cl.
CPC ........... *H04N 19/13* (2014.11); *H04N 19/156* (2014.11); *H04N 19/176* (2014.11); *H04N 19/44* (2014.11); *H04N 19/60* (2014.11); *H04N 19/91* (2014.11)

(58) Field of Classification Search
CPC ................................ H04N 19/13; H04N 19/60
(Continued)

(56) References Cited

U.S. PATENT DOCUMENTS 6,987,468 B1 1/2006 Malvar
2012/0014454 A1 1/2012 Budagavi et al.
(Continued)

FOREIGN PATENT DOCUMENTS

AU 2012202182 A1 10/2013
CN 102238387 A 11/2011
(Continued)

OTHER PUBLICATIONS

Alshin, et al., "Multi-parameter probability up-date for CABAC," Joint Collaborative Team on Video Coding (JCT-VC) of ITU-T SG16 WP3 and ISO/IEC JTC1/SC29/WG11 6th Meeting: Torino, IT, Jul. 14-22, 2011, JCTVC-F254, 7 pp.
(Continued)

*Primary Examiner* — William C Vaughn, Jr.
*Assistant Examiner* — Jerry Jean Baptiste

(57) ABSTRACT

Techniques are described for updating a value of a Rice parameter used to define Golomb codes for coefficient level coding. The Golomb codes defined by the Rice parameter may be used to code a remaining absolute value of a coefficient level for at least one coefficient in a coefficient group (CG). According to the techniques, the value of the Rice parameter is updated based on a selection of a minimum of either a maximum value of the Rice parameter or a variable increment of the value of the Rice parameter. The variable increment is determined based on the value of the Rice parameter and an absolute value of the coefficient level for the current coefficient being coded. Techniques are also described for adjusting the value of the Rice parameter used to define Golomb codes for coefficient level coding based on whether a transform is applied to a transform block.

34 Claims, 8 Drawing Sheets

Related U.S. Application Data filed on Jun. 7, 2013, provisional application No. 61/845,850, filed on Jul. 12, 2013, provisional application No. 61/953,647, filed on Mar. 14, 2014.

(51) Int. Cl.
    *H04N 19/176*      (2014.01)
    *H04N 19/60*      (2014.01)
    *H04N 19/156*      (2014.01)
    *H04N 19/44*      (2014.01)

(58) Field of Classification Search
    USPC .......................................................... 375/240
    See application file for complete search history.

(56) References Cited

U.S. PATENT DOCUMENTS

| | | | |
|---|---|---|---|
| 2013/0003838 A1* | 1/2013 | Gao ..................... | H04N 19/176 375/240.12 |
| 2013/0004092 A1 | 1/2013 | Sasai et al. | |
| 2013/0188699 A1 | 7/2013 | Joshi et al. | |
| 2013/0301738 A1* | 11/2013 | Kim ..................... | H04N 19/176 375/240.18 |
| 2013/0343464 A1 | 12/2013 | Van Der Auwera et al. | |
| 2014/0003529 A1 | 1/2014 | Joshi et al. | |
| 2014/0362925 A1 | 12/2014 | Nguyen et al. | |
| 2015/0016537 A1 | 1/2015 | Karczewicz et al. | |
| 2015/0078443 A1* | 3/2015 | Kolesnikov ......... | H03M 7/4075 375/240.03 |
| 2015/0181237 A1* | 6/2015 | Tsukuba ................ | H04N 19/44 382/233 |

FOREIGN PATENT DOCUMENTS

| | | |
|---|---|---|
| CN | 102368385 A | 3/2012 |
| EP | 1653746 A2 | 5/2006 |
| WO | 2012155553 A1 | 11/2012 |
| WO | 2013107908 A1 | 7/2013 |

OTHER PUBLICATIONS

Amonou, I., et al., "Description of video coding technology proposal by France Telecom, NTT, NTT DOCOMO, Panasonic and Technicolor," ITU-T SG16 WP3 and ISOIIEC JTCIISC29NVG11, Document JCTVC-A114, Dresden, DE, Apr. 15-23, 2010, 42 pages.

Karczewicz et al., "RCE2: Results of Test 1 on Rice Parameter Initialization," (Joint Collaborative Team on Video Coding of ISO/IEC JTC1/SC29/WG11 and ITU-T SG.16); Jan. 9-17, 2014, Document: JCTVC-P0199_r2, 6 pp.

Taiwan Search Report—TW103113479—TIPO—dated Dec. 23, 2015 (1 page).

Budagavi, "AHG8: Coefficient level RiceParam updates for screen content coding," 13th JCT-VC Meeting; Apr. 18-26, 2013; Incheon; (Joint Collaborative Team on Video Coding of ISO/IEC JTC1/SC29/WG11 and ITU-T SG16); URL: http://wftp3.itu.int/av-arch/jctvc-site/, No. JCTVC-M0316, 2013, 5 pp.

International Search Report and Written Opinion from International Application No. PCT/US2014/033780, dated Nov. 3, 2014, 24 pp.

Karczewicz, et al., "Non-RCE2: Rice Parameter Initialization", JCT-VC Meeting; Jul. 25-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/, No. JCTVC-N0181-v2, XP030114665, 8 pp.

Karczewicz, et al., "RCE2: Results of Test D1 on Rice Parameter Initialization", JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-00239-v3, XP030115298, 7 pp.

Memon "Adaptive coding of DCT coefficients by Golomb-Rice codes",Image Processing, 1998. ICIP 98. Proceedings. 1998 International Conference on Chicago, IL, USA Oct. 4-7, 1998, Los Alamitos, CA, USA,IEEE Comput. Soc, US, vol. 1, Oct. 1998, XP010308805, pp. 516-520.

Nguyen, et al., "Non-CE11: Proposed Cleanup for Transform Coefficient Coding," Document JCTVC-H0228, Joint Collaborative Team on Video Coding (JCT-VC) of ITU-T SG16 WP3 and ISO/IEC JTC1/SC29/WG11, 8th Meeting: San José, CA, USA, XP030111255, Feb. 1-10 , 2012, 9 pp.

Nguyen, et al., "Reduced-complexity entropy coding of transform coefficient levels using a combination of VLC and Pipe", JCT-VC Meeting; MPEG Meeting; Jan. 20-28, 2011; Daegu;(Joint Collaborative Team on Video Coding of ISO/IEC JTC1/SC29/WG11 AND ITU-T SG.16);URL:http://wftp3.itu.int/av-arch/jctvc-site/, No. JCTVC-D336, XP030008375, 8 pp.

Partial International Search Report from International Application No. PCT/US2014/033780, dated Aug. 21, 2014, 11 pp.

Sole et al., "AhG8: Simplified update of the coefficient level Rice parameter," 13th JCT-VC Meeting; Apr. 18-26, 2013; Incheon; (Joint Collaborative Team on Video Coding of ISO/IEC JTC1/SC29/WG11 and ITU-T SG16); URL: http://wftp3.itu.int/av-arch/jctvc-site/, No. JCTVC-M0366, 2013, 3 pp.

Sole, et al., "RCE2 Test A1: Simplified update of the coefficient level Rice Parameter", JCT-VC Meeting; Oct. 23, 2013-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-00206, XP030115251, 5 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, It, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (for FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

(56) References Cited

OTHER PUBLICATIONS

Sole, et al., "Transform Coefficient Coding in HEVC," IEEE Transactions on Circuts and Systems for Video Technology, vol. 22, No. 12, Dec. 12, pp. 1765-1777.
Response to Written Opinion dated Nov. 3, 2014, from International Application No. PCT/US2014/033780, filed on Feb. 12, 2015, 9 pp.
Second Written Opinion from International Application No. PCT/US2014/033780, dated May 8, 2015, 12 pp.
Response to Second Written Opinion dated May 8, 2015, from International Application No. PCT/US2014/033780, filed on Jul. 8, 2015, 9 pp.
International Preliminary Report on Patentability from International Application No. PCT/US2014/033780, dated Jul. 27, 2015, 17 pp.
International Preliminary Report on Patentability from International Application No. PCT/US2014/046218, dated Sep. 29, 2015, 13 pp.
International Search Report and Written Opinion from International Application No. PCT/US2014/046218, dated Jan. 9, 2015, 23 pp.
Partial International Search Report from International Application No. PCT/US2014/046218, dated Oct. 14, 2014, 11 pp.
Second Written Opinion from International Application No. PCT/US2014/046218, dated Jul. 2, 2015, 12 pp.
Response to Written Opinion dated Jan. 9, 2015, from International Application No. PCT/US2014/046218, filed on May 11, 2015, 9 pp.
Response to Second Written Opinion dated Jul. 2, 2015, from International Application No. PCT/US2014/046218, filed on Sep. 2, 2015, 28 pp.
Non-Final Office Action from U.S. Appl. No. 14/327,398 dated Jun. 20, 2017 (21 pages).
Examination Report from Australian Application Serial No. 2014287132 dated Aug. 22, 2017 (4 pages).
Response to Office Action dated Jun. 20, 2017 from U.S. Appl. No. 14/327,398, filed Sep. 20, 2017, 26 pp.
Final Office Action from U.S. Appl. No. 14/327,398 dated Dec. 26, 2017 (22 pages).

\* cited by examiner

RICE PARAMETER UPDATE FOR COEFFICIENT LEVEL CODING IN VIDEO CODING PROCESS

This application claims the benefit of U.S. Provisional Patent Application No. 61/811,632, filed Apr. 12, 2013, U.S. Provisional Patent Application No. 61/832,652, filed Jun. 7, 2013, U.S. Provisional Patent Application No. 61/845,850, filed Jul. 12, 2013, and U.S. Provisional Patent Application No. 61/953,647, filed Mar. 14, 2014, the entire content of each of which is incorporated herein by reference.

TECHNICAL FIELD

This disclosure relates to video coding, and more particularly to techniques for coding transform coefficients.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4. ITU-T H.263, ITU-T H.264/MPEG-4, Part 10. Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video slice, i.e., a video frame or a portion of a video frame) may be partitioned into blocks. Video blocks in an intra-coded (I) slice of a picture are encoded using spatial prediction with respect to reference samples in neighboring blocks in the same picture. Video blocks in an inter-coded (P or B) slice may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients, and entropy coding may be applied to achieve even more compression.

SUMMARY

In general, this disclosure describes techniques for updating a value of a Rice parameter used to define Golomb codes for coefficient level coding. In particular, this disclosure describes techniques for updating the value of the Rice parameter used to define Golomb codes for coding remaining absolute values of coefficient levels for coefficients where context adaptive binary arithmetic coding (CABAC) is used to code indications of significant coefficients, coefficient levels greater than 1, and coefficient levels greater than 2. In some examples, the techniques may be applied to a Rice parameter update for coefficient level coding in range extensions for the high efficiency video coding (HEVC) standard. The Golomb codes defined by the Rice parameter may be used to code a remaining absolute value of a coefficient level for at least one coefficient in a coefficient group (CG), i.e., a block of coefficients. The CG may reside within a transform block of a transform unit (TU).

According to the techniques of this disclosure, the value of the Rice parameter is updated based on a selection of a minimum of either a maximum value of the Rice parameter or a variable increment of the value of the Rice parameter. An amount of the variable increment is determined based on the value of the Rice parameter and an absolute value of the coefficient level for the current coefficient being coded. The Rice parameter update scheme described in this disclosure allows the Rice parameter to quickly and efficiently adapt between natural content and screen content during the course of coding remaining absolute values of coefficient levels for coefficients in the CG.

In addition, this disclosure describes techniques for adjusting the value of the Rice parameter used to define Golomb codes for coefficient level coding based on whether a transform is applied to a transform block that includes the CG. According to the techniques, if the transform is not applied to the transform block, i.e., in the case of transform skip or bypass, the Rice parameter update scheme described in this disclosure is used to update the value of the Rice parameter for coding remaining absolute values of coefficient levels for subsequent coefficients in the CG. In addition, according to the techniques, if the transform is not applied to the transform block, the value of the Rice parameter may be initialized for a subsequent CG in the transform block based on the value of the Rice parameter after coding the remaining absolute values of coefficient levels for the coefficients in the current CG. Otherwise, if the transform is applied to the transform block, the Rice parameter may be adjusted according to the HEVC Rice parameter update and initialization schemes.

In one example, this disclosure is directed to a method of decoding coefficients in a video decoding process, the method comprising determining a block of coefficients of residual video data, decoding a remaining absolute value of a coefficient level for at least one of the coefficients using Golomb codes defined by a Rice parameter, and adjusting a value of the Rice parameter based on whether a transform is applied to a transform block that includes the block of coefficients.

In a further example, this disclosure is directed to a method of encoding coefficients in a video decoding process, the method comprising determining a block of coefficients of residual video data, encoding a remaining absolute value of a coefficient level for at least one of the coefficients using Golomb codes defined by a Rice parameter, and adjusting a value of the Rice parameter based on whether a transform is applied to a transform block that includes the block of coefficients.

In an additional example, this disclosure is directed to a video coding device comprising a memory configured to store video data and one or more processors. The processors are configured to determine a block of coefficients of residual video data, code a remaining absolute value of a coefficient level for at least one of the coefficients using Golomb codes defined by a Rice parameter, and adjust a value of the Rice parameter based on whether a transform is applied to a transform block that includes the block of coefficients.

In another example, this disclosure is directed to a video coding device comprising means for determining a block of coefficients of residual video data, means for coding a remaining absolute value of a coefficient level for at least one of the coefficients using Golomb codes defined by a Rice parameter, and means for adjusting a value of the Rice parameter based on whether a transform is applied to a transform block that includes the block of coefficients.

In an additional example, this disclosure is directed to a computer-readable storage medium comprising instructions that when executed by one or more processors of a video coding device cause the processors to determine a block of coefficients of residual video data, code a remaining absolute value of a coefficient level for at least one of the coefficients using Golomb codes defined by a Rice parameter, and adjust a value of the Rice parameter based on whether a transform is applied to a transform block that includes the block of coefficients.

In another example, this disclosure is directed to a method of decoding coefficients in a video decoding process, the method comprising determining a block of coefficients of residual video data, decoding a remaining absolute value of a coefficient level for at least one of the coefficients using Golomb codes defined by a Rice parameter, and updating a value of the Rice parameter based on a selection of a minimum of either a maximum value of the Rice parameter or a variable increment of the value of the Rice parameter, wherein the variable increment is determined based on the value of the Rice parameter and an absolute value of the coefficient level for the coefficient being decoded.

In another example, this disclosure is directed to method of encoding coefficients in a video encoding process, the method comprising determining a block of coefficients of residual video data encoding a remaining absolute value of a coefficient level for at least one of the coefficients using Golomb codes defined by a Rice parameter, and updating a value of the Rice parameter based on a selection of a minimum of either a maximum value of the Rice parameter or a variable increment of the value of the Rice parameter, wherein the variable increment is determined based on the value of the Rice parameter and an absolute value of the coefficient level for the coefficient being encoded.

In a further example, this disclosure is directed to a video coding device comprising a memory configured to store video data and one or more processors. The processors are configured to determine a block of coefficients of residual video data, code a remaining absolute value of a coefficient level for at least one of the coefficients using Golomb codes defined by a Rice parameter, and update a value of the Rice parameter based on a selection of a minimum of either a maximum value of the Rice parameter or a variable increment of the value of the Rice parameter, wherein the variable increment is determined based on the value of the Rice parameter and an absolute value of the coefficient level for the coefficient being coded.

The details of one or more examples are set forth in the accompanying drawings and the description below. Other features, objects, and advantages will be apparent from the description and drawings, and from the claims.

DETAILED DESCRIPTION

Figure 1:
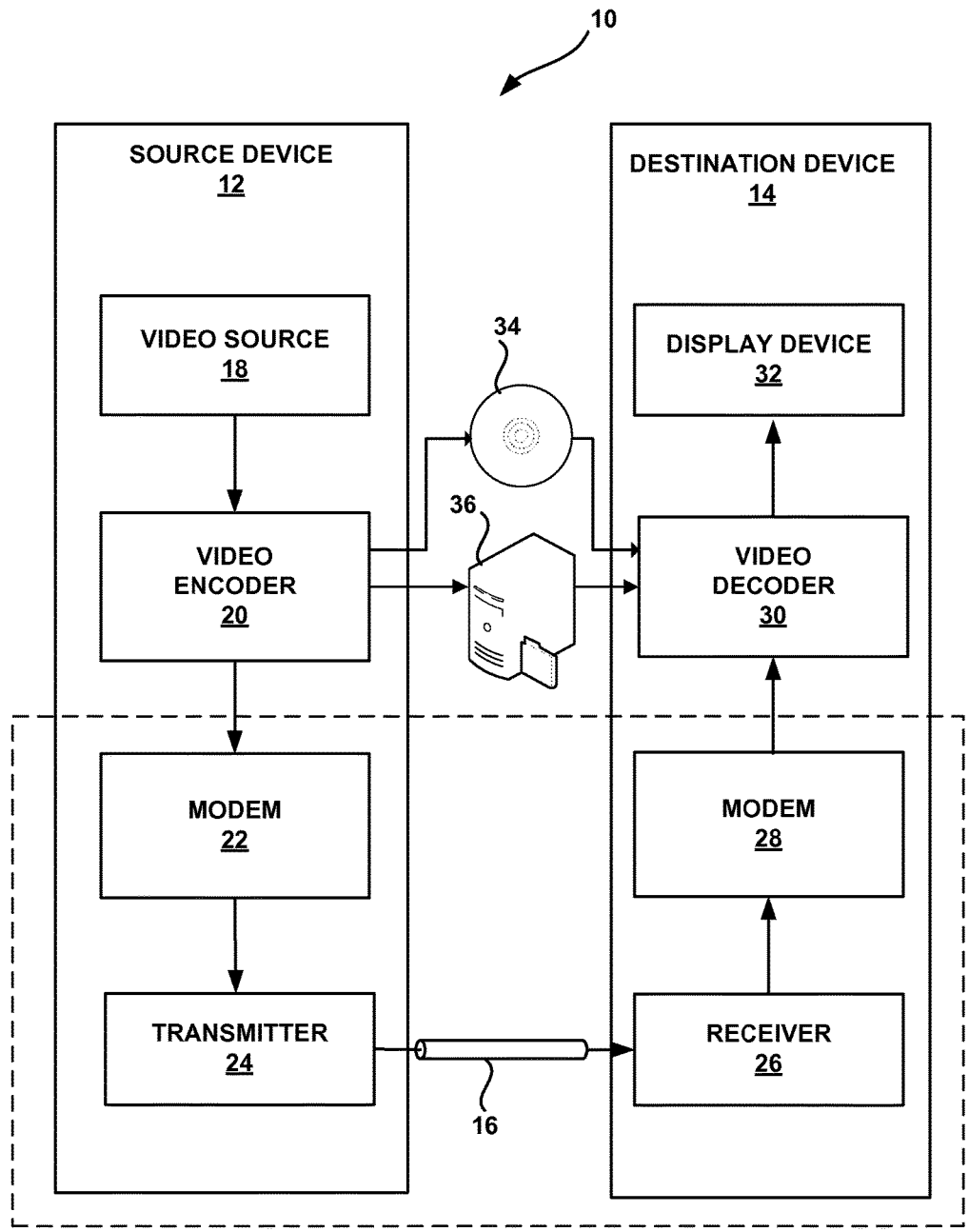
FIG. 1 is a block diagram illustrating an example video encoding and decoding system that may utilize the techniques for coding coefficient levels described in this disclosure.

This disclosure describes techniques for updating a value of a Rice parameter used to define Golomb codes for coefficient level coding. In particular, this disclosure describes techniques for updating the value of the Rice parameter used to define Golomb codes for coding remaining absolute values of coefficient levels for coefficients where context adaptive binary arithmetic coding (CABAC) is used to code indications of significant coefficients, coefficient levels greater than 1, and coefficient levels greater than 2. In some examples, the techniques may be applied to a Rice parameter update for coefficient level coding in range extensions for the high efficiency video coding (HEVC) standard. The Rice parameter is a tunable value used to select a codeword set from the family of Golomb codes. The Golomb codes defined by the Rice parameter may be used to code a remaining absolute value of a coefficient level for at least one coefficient in a coefficient group (CG), i.e., a block of coefficients.

According to the techniques of this disclosure, the value of the Rice parameter is updated based on a selection of a minimum of either a maximum value of the Rice parameter or a variable increment of the value of the Rice parameter. An amount of the variable increment is determined based on the value of the Rice parameter and an absolute value of the coefficient level for the current coefficient being coded. In some examples, the variable increment may be determined based on a right shifted version of the absolute value of the coefficient level for the current coefficient where an amount of the right shift is based on the value of the Rice parameter.

The variable increment enables the value of the Rice parameter to increase by any integer value up to the maximum value of the Rice parameter. For example, the maximum value of the Rice parameter may be equal to 7 and the variable increment may by equal to any of 0, 1, 2, 3, 4, 5 or 6 depending on the value of the Rice parameter and the absolute value of the coefficient level for the current coefficient. In other examples, the maximum value of the Rice parameter may be equal to 4 or 5. In a further example, the techniques of this disclosure may allow the Rice parameter to be decreased or decremented during an update.

In some examples, a video encoder may encode coefficient levels of residual video data into a bitstream for transmission to a video decoder or a storage device. Upon receipt of the encoded bitstream, the video decoder may decode the coefficient levels of the residual video data in a reciprocal manner to the video encoder. In the case of lossy video coding, the coefficients may be quantized transform coefficients. In the case of lossless video coding or lossy video coding with transform skipping or bypass, the coefficients may have coefficient levels with large absolute values. When the coefficients represent screen content, which may include graphics and text regions, the content may not be well predicted resulting in large absolute values of coefficient levels for the coefficients.

The Rice parameter update scheme described in this disclosure allows the Rice parameter to quickly and efficiently adapt to large coefficient values, which may occur in blocks of screen content and blocks with transform skipping or bypass. According to the techniques, the value of the Rice parameter may be updated based on a variable increment in order to adapt more rapidly to accommodate screen content and/or coefficients that have not been transformed or quantized, but still handle coefficient level coding of transform coefficients for natural content with similar performance as an HEVC Rice parameter update scheme. For example, when a coefficient level for a current coefficient being coded has a large absolute value, the variable increment may be equal to an integer value greater than one in order to more quickly adapt to the large coefficient values. The techniques of this disclosure also provide greater computational efficiency by reducing or eliminating conditional operations during Rice parameter updates within the loop of coefficient level entropy coding.

In addition, this disclosure describes techniques for adjusting the value of the Rice parameter used to define Golomb codes for coefficient level coding based on whether a transform is applied to a transform block that includes the CG. As described in this disclosure, adjusting the value of the Rice parameter may include updating the value of the Rice parameter to define the Golomb codes for coding a remaining absolute value of a coefficient level for a subsequent coefficient in the CG, or initializing the value of the Rice parameter to define the Golomb codes for coding a remaining absolute value of a coefficient level for at least one coefficient in a subsequent CG.

According to the techniques, if the transform is not applied to the transform block, i.e., in the case of transform skip or bypass, the Rice parameter update scheme described in this disclosure is used to update the value of the Rice parameter. Otherwise, if the transform is applied to the transform block, the HEVC Rice parameter update scheme may be used to update the value of the Rice parameter. In another example, according to the techniques, if the transform is not applied to the transform block, the value of the Rice parameter may be initialized for a subsequent CG in the transform block based on the value of the Rice parameter after decoding the remaining absolute values of coefficient levels for the coefficients in the current CG. Otherwise, if the transform is applied to the transform block, the value of the Rice parameter may be initialized to be equal to zero for a subsequent CG in the transform block.

FIG. 1 is a block diagram illustrating an example video encoding and decoding system 10 that may utilize the techniques for coding coefficient levels described in this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smart-phones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for coding coefficient levels, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones, which may be provided, e.g., within smartphones or tablet computers. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wired or wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and, in the case of wireless communication, one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on the storage medium 34 may then be accessed by destination device 14 for decoding and playback. Although not shown in FIG. 1, in some examples, storage medium 34 and/or file server 36 may store the output of transmitter 24.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard in document JCTVC-L1003v34, Bross et al., "High efficiency video coding (HEVC) text specification draft 10," Joint Collaborative Team on Video Coding (JCT-VC) of ITU-T SGI6 WP3 and ISO/IEC JTCI/SC29/WG11, 12th Meeting: Geneva, CH, 14-23 January, 2013, is available from http://phenix.int-evry.fr/jct/doc_end_user/documents/12_Genevawgl 1/JCTVC-L1003-v34.zip.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 may implement any or all of the techniques of this disclosure for encoding coefficient levels in a video encoding process. Likewise, video decoder 30 may implement any or all of these techniques for decoding coefficient levels in a video decoding process. A video coder, as described in this disclosure, may refer to a video encoder or a video decoder. Similarly, a video coding unit may refer to a video encoder or a video decoder. Likewise, video coding may refer to video encoding or video decoding.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences. The HEVC standard described above is based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HEVC HM may provide as many as thirty-three intra-prediction encoding modes. The following section will discuss certain aspects of the HM in more detail.

For video coding according to the HEVC standard, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component.

A CU is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PUs may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

The emerging HEVC standard allows for transformations according to transform units (TUs), which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized. A TU includes a luma transform block and two chroma transform blocks. As such, any coding process discussed below that is applied to a TU, may be, in actuality, applied to the luma and chroma transform blocks.

In general, a PU refers to data related to the prediction process. For example, when the PU is intra-mode encoded, the PU may include data describing an intra-prediction mode for the PU. As another example, when the PU is inter-mode encoded, the PU may include data defining a motion vector for the PU.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock. i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

To code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionally inter-coded (P) or bi-directionally inter-coded (B) with respect to blocks of reference samples in other previously-coded frames (or slices). In each case, the reference samples may be used to form a predictive block for a block to be coded.

Upon identification of a predictive block, the difference between the pixels in the original video data block and the pixels in its predictive block is determined. This difference may be referred to as the prediction residual data, and indicates the pixel differences between the pixel values in the block to the coded and the pixel values in the predictive block selected to represent the coded block. To achieve better compression, the prediction residual data may be transformed, e.g., using a discrete cosine transform (DCT), a discrete sine transform (DST), an integer transform, a Karhunen-Loeve (K-L) transform, or another transform to produce transform coefficients.

The residual data in a transform block, such as a TU, may be arranged in a two-dimensional (2D) array of pixel difference values residing in the spatial, pixel domain. A transform converts the residual pixel values into a two-dimensional array of transform coefficients in a transform domain, such as a frequency domain. For further compression, the transform coefficients may be quantized prior to entropy coding. In some examples, such as lossless coding or lossy coding with transform skipping or bypass, both the transform and quantization procedures may be skipped for the coefficients.

An entropy coder then applies entropy coding, such as Context Adaptive Variable Length Coding (CAVLC), Context Adaptive Binary Arithmetic Coding (CABAC), Probability Interval Partitioning Entropy Coding (PIPE), or the like, to the coefficients. In some examples, video encoder 20 may utilize a predefined scan order to scan the coefficients to produce a serialized vector that can be entropy encoded. In other examples, video encoder 20 may perform an adaptive scan. After scanning the coefficients to form a one-dimensional vector, video encoder 20 may entropy encode the one-dimensional vector, Video encoder 20 may also entropy encode syntax elements associated with the encoded video data for use by video decoder 30 in decoding the video data.

This disclosure is related techniques for context adaptive binary arithmetic coding (CABAC) entropy coders or other entropy coders, such as probability interval partitioning entropy coding (PIPE) or related coders. Arithmetic coding is a form of entropy coding used in many compression algorithms that have high coding efficiency, because it is capable of mapping symbols to non-integer length codewords. An example of an arithmetic coding algorithm is Context Based Binary Arithmetic Coding (CABAC).

In general, entropy coding data symbols using CABAC involves one or more of the following steps:

(1) Binarization: If a symbol to be coded is non-binary valued, it is mapped to a sequence of so-called "bins." Each bin can have a value of "0" or "1."

(2) Context Assignment: Each bin (in regular mode) is assigned to a context. A context model determines how a context for a given bin is calculated based on information available for the bin, such as values of previously encoded symbols or bin number.

(3) Bin encoding: Bins are encoded with an arithmetic encoder. To encode a bin, the arithmetic encoder requires as an input a probability of the bin's value. i.e., a probability that the bin's value is equal to "0," and a probability that the bin's value is equal to "1." The estimated probability of each context is represented by an integer value called a "context state." Each context has a state, and thus the state (i.e., estimated probability) is the same for bins assigned to one context, and differs between contexts.

(4) State update: The probability state for a selected context is updated based on the actual coded value of the bin (e.g., if the bin value was "1," the probability of "1's" is increased).

In the case of entropy coding data symbols using CABAC in bypass mode, a symbol to be coded is binarized to a sequence of bins and arithmetically coded with a fixed equal probability model (e.g., with an Exponential-Golomb code or a Golomb-Rice code). The bypass mode does not require context assignment or probability state update. For example, this disclosure describe techniques for bypass coding of remaining absolute values of coefficient levels for coefficients using Golomb codes defined by a Rice parameter. It should be noted that probability interval partitioning entropy coding (PIPE) uses principles similar to those of arithmetic coding, and can thus also utilize the techniques of this disclosure.

CABAC in H.264/AVC and HEVC uses states, and each state is implicitly related to a probability. There are variants of CABAC, in which a probability of a symbol ("0" or "1") is used directly, i.e., the probability or an integer version of the probability is the state. For example, such variants of CABAC are described in "Description of video coding technology proposal by France Telecom, NTT, NTT DOCOMO, Panasonic and Technicolor," JCTVC-A114, $1^{st}$ JCT-VC Meeting, Dresden, Del. April 2010, referred to as "JCTVC-A114" hereinafter, and A. Alshin and E. Alshina, "Multi-parameter probability update for CABAC," JCTVC-F254. $6^{th}$ JCT-VC Meeting, Torino, IT, July 2011, referred to as "JCTVC-F254"hereinafter.

To entropy code a block of coefficients, whether transformed and quantized or neither transformed nor quantized, a scanning process is usually performed so that the two-dimensional (2D) array of coefficients in a block is rearranged, according to a particular scan order, into an ordered, one-dimensional (1D) array, i.e., vector, of coefficients. Entropy coding is then applied to the vector of coefficients. The scan of the coefficients in a transform unit serializes the 2D array of coefficients for the entropy coder. A significance map may be generated to indicate the positions of significant (i.e., non-zero) coefficients. Scanning may be applied to scan levels of significant (i.e., nonzero) coefficients, and/or to code signs of the significant coefficients.

In the HEVC standard, position information of the significant transform (e.g., the significance map) is first coded for a transform block to indicate the location of the last non-zero coefficient in the scan order. The significance map and the level information (i.e., the absolute values and signs of the coefficients) are coded for each coefficient in an inverse scan order.

Figure 2:
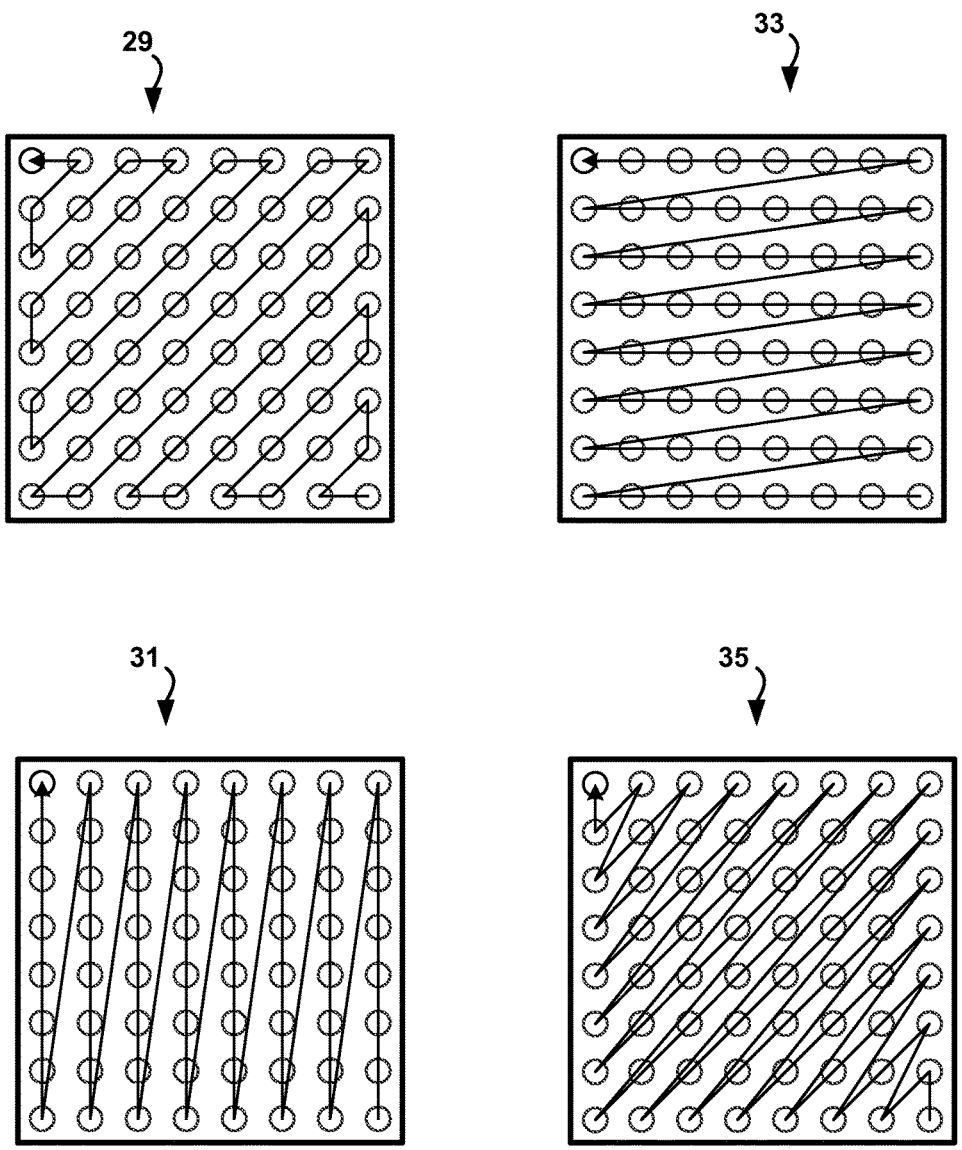
FIG. 2 is a conceptual drawing showing example inverse scan orders for coefficient level coding.

FIG. 2 is a conceptual drawing showing example inverse scan orders for coefficient level coding. The H.264 standard defines a zig-zig scan. The HEVC standard defines three different scans: a subblock diagonal scan, a subblock horizontal scan, and a subblock vertical scan. FIG. 2 illustrates an inverse zig-zag scan pattern 29, an inverse vertical scan pattern 31, an inverse horizontal scan pattern 33, and an inverse diagonal scan pattern 35 each applied to an 8×8 subblock of a transform block. Note that each of inverse diagonal scan pattern 35, inverse zig-zag scan pattern 29, inverse vertical scan pattern 31, and inverse horizontal scan pattern 33 proceed from higher frequency coefficients in the lower right corner of the transform block to lower frequency coefficients in the upper left corner of the transform block.

Subblock diagonal scan pattern 35, subblock horizontal scan pattern 33, and subblock vertical scan pattern 31 may be applied for 4×4 and 8×8 transform blocks. Subblock diagonal scan pattern 35 may also be applied for 16×16 and 32×32 transform blocks in the HEVC standard. In some examples, subblock diagonal scan pattern 35 may also be applied to an 8×8 TU. In a subblock-based scan, one 4×4 subblock of a larger transform block is scanned before proceeding to another 4×4 subblock within the larger transform block. In other examples, a "subblock" may consist of a number of consecutively scanned coefficients according to the scan order used. For example, the "subblock" may consist of 16 consecutively scanned coefficients along a diagonal scan order.

Figure 3:
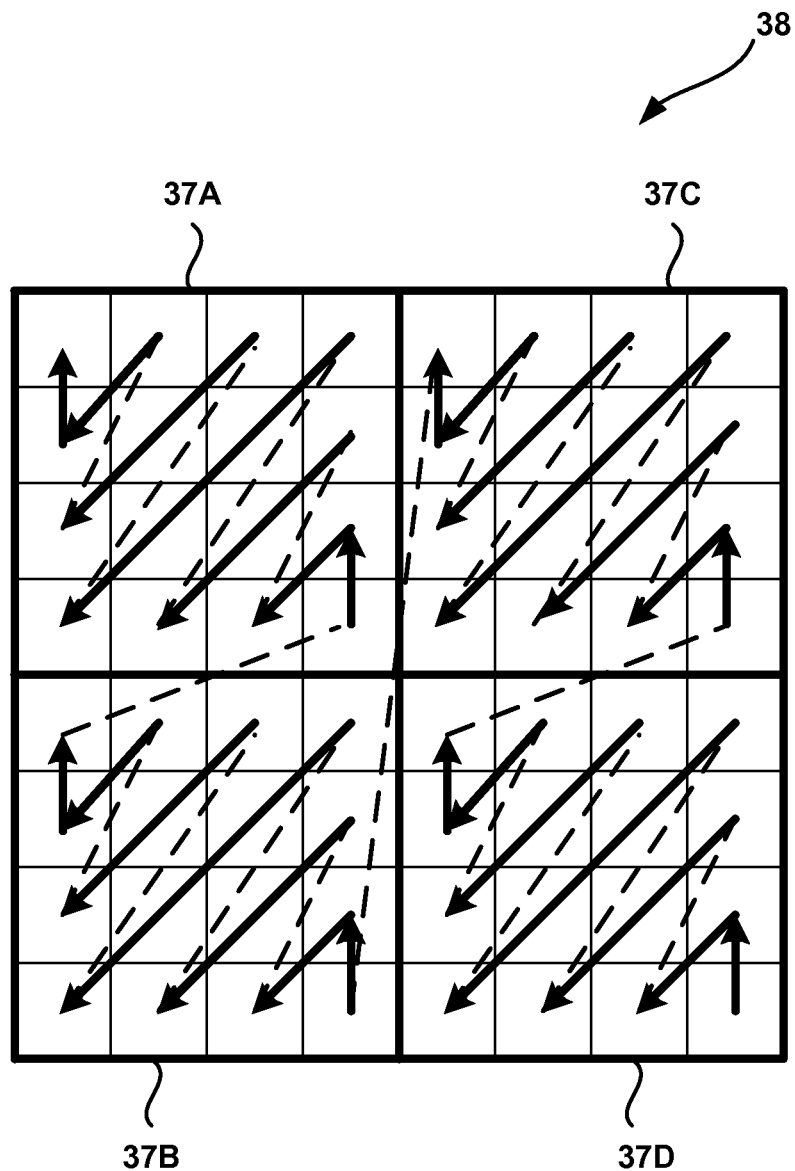
FIG. 3 is a conceptual drawing showing an example subblock-based inverse diagonal scan order for coefficient level coding of coefficient groups (CGs).

FIG. 3 is a conceptual drawing showing an example subblock-based inverse diagonal scan order for coefficient level coding of coefficient groups (CGs). FIG. 3 illustrates an 8×8 transform block 38 that consists of four 4×4 subblocks (37A, 37B, 37C, 37D). As shown in FIG. 3, coefficients in subblock 37D are scanned before scanning coefficients in subblock 37C. The scan then proceeds from subblock 37C to subblock 37B, and finally to subblock 37A. FIG. 3 depicts an inverse diagonal scan order in each subblock. In other examples, any scanning order may be used (e.g., horizontal, vertical, zigzag, etc.). In some examples, forward scanning orders may be used within each subblock.

In the HEVC standard, coefficients may be grouped into a chunk or subset. The significance map and level information (i.e., absolute value and sign) of the coefficients are coded for each subset. The subset of coefficients may be referred to in this disclosure as a coefficient group (CG). A CG may be defined as 16 consecutive coefficients in a scan order for a transform block, which may correspond to a 4×4 subblock. In one example, a subset consists of 16 consecutive coefficients along a scan order (e.g., a forward or inverse diagonal, horizontal, or vertical scan order) for a 4×4 transform block and an 8×8 transform block. For 16×16 and 32×32 transform blocks, a 4×4 subblock of coefficients within the larger transform block are treated as a subset. In the example of FIG. 3, each of subblocks 37 may be a CG.

The symbols described below are coded to represent the coefficient level information within a CG. In one example, all the symbols are coded in an inverse scan order. Each of the symbols may be coded in a separate scan of the CG according to the inverse scan order. The following symbols may be referred to as "flags." It should be noted that any of the "flags" discussed in this disclosure need not be limited to a binary symbol, but may also be implemented as multiple bit syntax elements.

The significant_coeff_flag, also referred to as the sigMapFlag, indicates the significance of each coefficient in a subset. A coefficient with an absolute value of greater than zero is considered to be significant. As one example, a sigMapFlag value of 0 indicates that the coefficient is not significant, i.e., not greater than zero, while a value of 1 indicates that the coefficient is significant, i.e., greater than zero. This flag may generally be referred to as a significance flag. The coeff_sign_flag, also referred to as the signFlag, indicates the sign information for any non-zero coefficients (i.e., coefficients with sigMapFlag as 1). For example, a zero for this flag indicates a positive sign, while a 1 indicates a negative sign.

The coeff_abs_level_greater1_flag, also referred to as the gr1Flag, indicates whether the absolute value of the coefficient is larger than one for any non-zero coefficients (i.e., coefficients with sigMapFlag as 1 or where the sigMapFlag is implicitly derived as 1). As one example, a gr1Flag value of 0 indicates that the coefficient does not have an absolute value greater than one, while a value of 1 for the gr1Flag indicates that the coefficient does have an absolute value greater than one. This flag may generally be referred to as a greater-than-one flag.

The coeff_abs_level_greater2_flag, also referred to as the gr2Flag, indicates whether the absolute value of the coefficient is larger than two for any coefficients with an absolute value larger than one (i.e., coefficients with gr1Flag as 1). As one example, a gr2Flag value of 0 indicates that the coefficient does not have an absolute value greater than two, while a value of 1 for the gr2Flag indicates that the coefficient does have an absolute value greater than two. This flag may generally be referred to as a greater-than-two flag. The sigMapFlag, gr1Flag and gr2Flag may each be coded using CABAC.

The coeff_abs_level_remaining syntax element, also referred to as the levelRem syntax element, indicates a remaining absolute value of the coefficient level for any coefficients with absolute values greater than the values coded by the previous flags. Generally, for the levelRem syntax element, the absolute value of the coefficient level minus three is coded (i.e., abs(level)−3) for each coefficient that has an absolute value larger than two (i.e. coefficients with gr2Flag as 1). In some examples, when a maximum number of the gr1Flag and/or the gr2Flag is reached for the current CG, the levelRem syntax element may be used to code coefficient levels with absolute values less than or equal to two. The levelRem syntax element may be coded using Golomb codes defined by a value of a Rice parameter.

Figure 4:
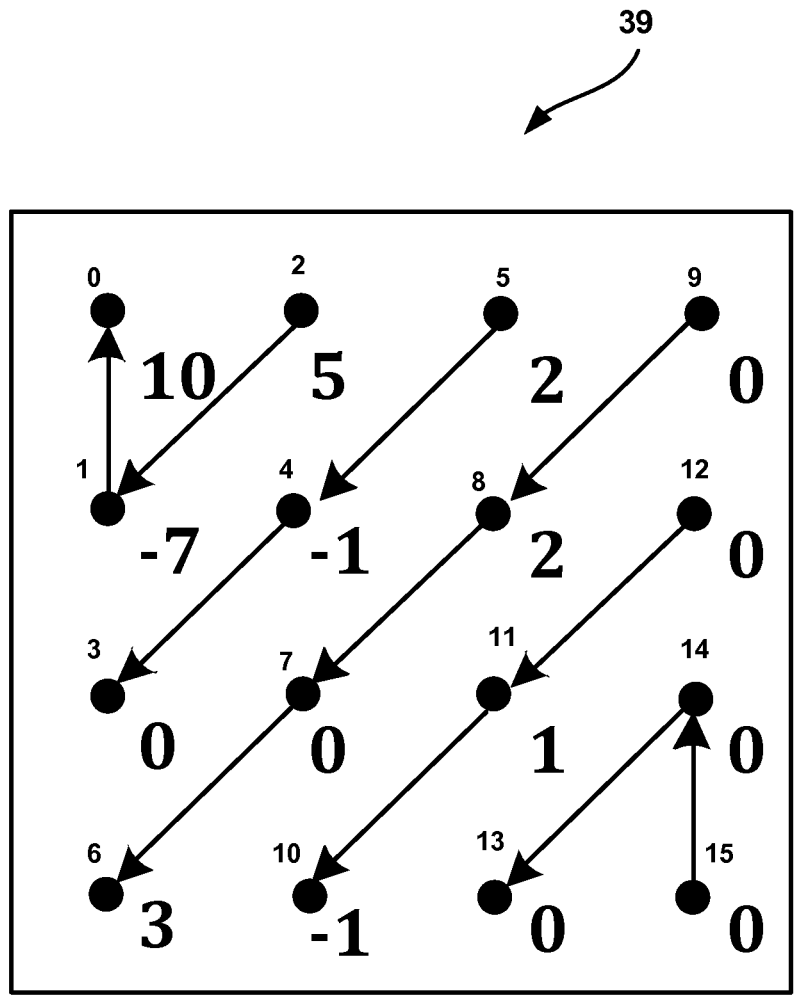
FIG. 4 is a conceptual drawing showing an example inverse diagonal scan order for coding coefficient levels for a CG.

FIG. 4 is a conceptual drawing showing an example inverse diagonal scan order for coding coefficient levels for a CG 39. CG 39 may be a 4×4 transform block or may be a 4×4 subblock in an 8×8, 16×16 or 32×32 transform block. The encoded symbols for the coefficients shown in FIG. 4, scanned in an inverse scan order, are summarized in Table 1. In Table 1, scan_pos refers to the position of the coefficient along the inverse diagonal scan pattern of CG 39 shown in FIG. 4. Scan_pos 15 is the first coefficient scanned and is located in the lower right corner of CG 39. The coefficient at scan_pos 15 has an absolute value of 0. Scan_pos 0 is the last coefficient scanned and is located in the upper left corner of CG 39. The quantized coefficient at scan_pos 0 has an absolute value of 10. In the case of a 4×4 transform block or the last 4×4 subblock in a larger transform block, the first four sigMapFlags do not need to be coded, since the position of the last non-zero coefficient is known. That is, coding of the sigMapFlag may begin at the last non-zero coefficient (in this example, the coefficient at scan_pos 11).

TABLE 1

Coded symbols for the coefficients of a coefficient group

| | Scan_pos | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Coefficients | 0 | 0 | 0 | 0 | 1 | −1 | 0 | 2 | 0 | 3 | 2 | −1 | 0 | 5 | −7 | 10 |
| sigMapFlag | 0 | 0 | 0 | 0 | 1 | 1 | 0 | 1 | 0 | 1 | 1 | 1 | 0 | 1 | 1 | 1 |
| gr1Flag | | | | | 0 | 0 | | 1 | | 1 | 1 | 0 | | 1 | 1 | 1 |
| gr2Flag | | | | | | | | 0 | | 1 | 0 | | | 1 | 1 | 1 |
| signFlag | | 0 | 1 | | | 0 | | 0 | | 0 | 0 | 1 | | 0 | 1 | 0 |
| levelRem | | | | | | | | | | 0 | | | | 2 | 4 | 7 |

Among these symbols, the bins of sigMapFlag, gr1Flag and gr2Flag are encoded with adaptive context models, e.g., using CABAC. The signFlag and binarized bins of levelRem are encoded through bypass mode with a fixed equal probability model (e.g., with an Exponential-Golomb code or a Golomb-Rice code).

As discussed above, the syntax element coeff_abs_level_remaining (i.e., levelRem) in the HEVC standard indicates the remaining absolute value of a coefficient level for a coefficient if the value is larger than that coded in previous scan passes for coefficient coding. This syntax element coded in bypass mode in order to increase throughput. The HEVC standard employs Golomb-Rice coding for small values and switches to Exponential-Golomb (Exp-Golomb) coding for larger values. The transition point between the Golomb-Rice codes and the Exp-Golomb codes is when the unary code length equals 4. A Rice parameter is a tunable value to select the codeword set from the family of Golomb codes.

For example, Golomb-Rice codes are a subset of Golomb codes and represent a value n>=0, given a tunable Rice parameter m, as a quotient q=floor(n/m) and a remainder r=n−q×m, where m is a power of 2. The quotient q is the prefix and has a unary code representation. The remainder r is the suffix and has a fixed length representation. In Exp-Golomb codes, the code structure is similarly formed by a unary prefix followed by a fixed length suffix, but the number of codewords in the suffix part doubles after each bit in the unary code. The Exp-Golomb codes, therefore, have a slower growth of the codeword length. In general, a larger value of the Rice parameter results in slower growth of the codes, which allows for greater efficiency when coding large coefficient values. Additional details on Rice parameters may be found in Transform Coefficient Coding in HEVC, by J. Sole, R. Joshi. M. Karczewicz, N. Nguyen, T. Ji, G. Clare, F. Henry, A. Duenas, IEEE Transactions on Circuits and Systems for Video Transmission (special issue on HEVC), December 2012.

In the HEVC standard, the Rice parameter is set equal a value of 0 at the beginning of each coefficient group (CG) and is conditionally updated during the coding of the CG depending on the value of the Rice parameter and the absolute value of the coefficient level for a current coefficient being coded as follows:

If absCoeffLevel>3*$2^{cRiceParam}$, then
    cRiceParam=min(cRiceParam+1,4) Otherwise,
    cRiceParam=cRiceParam, where cRiceParam is the Rice parameter, absCoeffLevel is the absolute value of the coefficient level for the current coefficient, and min( ) is a function that selects a minimum value. The HEVC Rice parameter update scheme allows the binarization process to gradually adapt to the coefficient statistics when large absolute values are observed in the distribution. As can be seen in the above equation, the HEVC Rice parameter update scheme updates the value of the Rice parameter by a fixed increment of 1 or 0.

An example of the HEVC Rice parameter update process in C-code is shown below:

```
if(absCoeff > 3*( 1<< cRiceParam))
{
    cRiceParam = min<UInt>(cRiceParam + 1, 4);
}
``` where cRiceParam is the Rice parameter, absCoeff is the absolute value of the coefficient level for the current coefficient, min( ) is a function that selects a minimum value, and << is the left bit-shift operation.

In the HEVC standard, the HEVC Rice parameter update process is described as follows.

The variable cRiceParam is derived from cLastAbsLevel and cLastRiceParam as:

cRiceParam=Min(cLastRiceParam+(cLastAbsLevel>
    (3*(1<<cLastRiceParam))?1:0),4)

In the above equation, cRiceParam is the updated value of the Rice parameter, Min( ) is a function that selects a minimum value, cLastRiceParam is the current value of the Rice parameter and cLastAbsLevel is the absolute value of the coefficient level for the current coded coefficient. The parameters are referred to using the term "Last" because the updated value of the Rice parameter may be used to define the Golomb codes for coding subsequent coefficients in a CG. The "?" is short hand for a conditional "if" statement. For example, the above equation may be considered as stating: if cLastAbsLevel ia greater than (3*(1<<cLastRiceParam)), then cLastRiceParam is incremented by 1, otherwise cLastRiceParam is not changed.

Techniques proposed in JCTVC-M0316. M. Budagavi, "AHG8: Coefficient level cRiceParam updates for screen content coding," Joint Collaborative Team on Video Coding (JCT-VC) of ITU-T SG 16 WP 3 and ISO/IEC JTC I/SC 29/WG 11, 13th Meeting: Incheon, KR, 18-26 Apr. 2013 (hereinafter, JCTVC-M0316), describe a faster update process for the Rice parameter. The techniques of JCTVC-M0316 target graphics and text regions, which have sharp edges that are sometimes not predicted well by the HEVC intra prediction tools. As a result of the prediction error, coefficient values may have high amplitude increases.

The contributions of JCTVC-M0316 present two modifications to the Rice parameter update process for coding the coeff_abs_level_remaining syntax element in order to improve lossless coding efficiency in the HEVC standard when encoding screen content video. The two modifications are: (1) a fast update for the value of the Rice parameter and (2) an increase in the maximum value of the Rice parameter from 4 to 5.

An example of the modified C-code for modification (1) of JCTVC-M0316 is as follows.

```
if(absCoeff > 25*(1<<cRiceParam)) {
    cRiceParam = 4;
}
else
if(absCoeff > 3*(1<<cRiceParam))
{
    cRiceParam = min<UInt>(cRiceParam+ 1, 4);
}
```

An example of the modified HEVC standard for modification (1) is as follows.

```
if ( cLastAbsLevel > ( 25 * ( 1 << cLastRiceParam ) ) ) cRiceParam = 4
else cRiceParam = Min( cLastRiceParam + ( cLastAbsLevel >
    ( 3 * ( 1 << cLastRiceParam ) ) ? 1 : 0 ), 4 )
```

For the combination of modifications (1) and (2) of JCTVC-M0316, an example of the modified C-code is as follows.

```
if(absCoeff > 25*(1<<cRiceParam)) {
    cRiceParam = 4;
}
else
if(absCoeff > 3*(1<<cRiceParam))
{
    cRiceParam = min<UInt>(cRiceParam + 1, 4);
}
if(cRiceParam == 4) {
    cRiceParam = 5;
}
```

An example of the modified HEVC standard for the combination of modifications (1) and (2) is the following.

```
if ( cLastAbsLevel > 25 * ( 1 << cLastRiceParam ) ) )  cRiceParam = 4
else cRiceParam = Min( cLastRiceParam + ( cLastAbsLevel >
    ( 3 * ( 1 << cLastRiceParam ) ) ? 1 : 0), 4 )
if ( cRiceParam == 4 ) cRiceParam = 5
```

The fast update techniques proposed in JCTVC-M0316 show good efficiency for some screen content. The techniques of JCTVC-M0316 are better adjusted to some video statistics than the HEVC Rice parameter update scheme since the Rice parameter goes directly to its maximum value when the absolute value of the coefficient level for the current coefficient is above a threshold. The fast adaptation process in JCTVC-M0316 basically sets the Rice parameter to a maximum value when a large coefficient is observed. In the HEVC standard, the Rice parameter (as shown in the above equations) only increases by 1 or 0 at the coding of the remaining absolute value for the coefficient level of each coefficient. In the HEVC Rice parameter update scheme, therefore, the Rice parameter may not adapt as fast to the coding of large coefficient values.

One potential drawback of the method proposed in JCTVC-M0316 is that it incorporates conditional checks in the Rice parameter update process. Such checks may make video encoder 20 and video decoder 30 slower. Also, the techniques of JCTVC-M0316 require an additional multiplication to be computed. Such additional computations have to be carried out within the loop of coefficient entropy coding, which is a critical loop in video coding, and may be a bottleneck.

In view of these drawbacks, this disclosure proposes techniques for a fast and efficient Rice parameter update scheme based on a variable increment according to the coefficient level values or video content. The techniques of this disclosure do not require the introduction of additional conditions in the critical loop, and in some cases may even remove some existing conditions in the HEVC Rice parameter update scheme. This disclosure introduces a fast update without additional logic that may be more flexible because the variable increment allows the value of the Rice parameter to increase by any amount up to achieving the maximum value of the Rice parameter.

In a first example of this disclosure, techniques for signaling parameters for the Rice parameter update are described. The current techniques in the HEVC standard for the Rice parameter update process are repeated below as:

```
if(absCoeff > 3*(1<< cRiceParam))
{
    cRiceParam = min<UInt>(cRiceParam + 1, 4);
}
``` where the cRiceParam is equal to 0 at the start of a CG.

The techniques of this disclosure can be expressed with four new parameters.
   INIT_PARAM: the initial value of the Rice parameter at the start of the CG
   INC_PARAM: the increment value of the Rice parameter
   MAX_PARAM: the maximum value of the Rice parameter
   THRESH_ABS_COEFF: the threshold value used in the update scheme for comparing to the absolute value of the coefficient level According to the techniques of this disclosure, video encoder 20 may be configured to signal one or more of these parameters in the bitstream. e.g., at the sequence parameter set (SPS), picture parameter set (PPS), slice header, LCU. CU, TU or transform block level. In this case, video encoder 20 may be configured to choose the best parameter for the content being encoded and signal the selection to video decoder 30.

An example of the expression in C-code of the Rice parameter update function of this disclosure, including the signaled parameters, is as follows.

```
cRiceParam = INIT_PARAM
...
if(absCoeff > THRESH_ABS_COEFF*(1<<cRiceParam))
{
    cRiceParam = min<UInt>(cRiceParam +
    INC_PARAM, MAX_PARAM);
}
```

In some examples, video encoder 20 and video decoder 30 may store default values of the parameters for the Rice parameter update scheme of this disclosure. For the HEVC standard coding of quantized transform coefficients for natural content, the values of the parameters, which could be the default values, may be as follows.
   INIT_PARAM=0
   INC_PARAM=1

MAX_PARAM=4
THRESH_ABS_COEFF=3

For coding coefficients, which have not been transformed or quantized, for screen content or for lossless coding, the default parameters may be different. For example, the default parameters may be as follows.

INIT_PARAM=2
INC_PARAM=1
MAX_PARAM=5
THRESH_ABS_COEFF=3

The above parameter values are merely examples. In other examples, other default values may be stored at video encoder 20 and video decoder 30. For example, MAX_PARAM may be equal to a value of 7. As another example, INC_PARAM may be equal to any integer value greater than 1 up to the maximum value.

In another example, video encoder 20 and/or video decoder 30 may be configured to use one set of values when the residual is coded in a lossy manner, and another set of values when the residual is coded in either a lossless manner (i.e., when the cu_transquant_bypass_flag is on). In another example, one set of values could be used for lossy coding in transform skip or transform bypass mode that is different from the HEVC values for lossy coding. In another example, the set of default values could depend on the transform type (e.g., DCT, DST, skip, or the like).

As described above, the HEVC Rice parameter update scheme increases the Rice parameter by at most 1 at each update (i.e., at each coefficient to be coded in bypass mode using Golomb codes defined by the Rice parameter). The fast adaptation process in JCTVC-M0316 basically sets the Rice parameter to a maximum value when a large coefficient is observed.

In another example, this disclosure presents a fast update technique that can be utilized without additional logic, or even by reducing the number of checks in the HEVC Rice parameter update scheme. This disclosure proposes the following method for fast and efficient update of the value of the Rice parameter that is flexible because it can increase the value of the Rice parameter by any amount up to achieving the maximum value.

According to this example of the disclosure, the C-code lines for the HEVC Rice parameter update scheme, which are repeated below:

```
if(absCoeff > 3*(1<<cRiceParam))
{
    cRiceParam = min<UInt>(cRiceParam + 1, 4);
}
``` would be replaced by $c$RiceParam=min<$U$Int>(($c$RiceParam+(absCoeff>>
(PARAM1*(2<<$c$RiceParam)))),MAX_RICE_PARAM);

where (absCoeff>>(PARAM 1*(2<<cRiceParam))) defines a variable increment of the value of the Rice parameter that is determined based on the value of the Rice parameter (i.e., cRiceParam) and an absolute value of a coefficient level for the coefficient being coded (i.e., absCoeff). In this example, the variable increment is determined based on a right shifted version of the absolute value of the coefficient level for the coefficient being coded (i.e., absCoeff), where an amount of the right shift is based on the value of the Rice parameter (i.e., cRiceParam).

In the above representation of the Rice parameter update scheme of this disclosure, one check is removed from the HEVC Rice parameter update scheme and two or three checks are removed with respect to the Rice parameter update scheme introduced in JCTVC-M0316. Essentially, cRiceParam is updated based on a selection of a minimum of either the maximum value of the Rice parameter (i.e., MAX_RICE_PARAM) or a variable increment of the value of the Rice parameter (i.e., cRiceParam) that is determined based on the absolute value of the coefficient being coded (i.e., absCoeff) divided (i.e., right shifted, ">>") by a function of the Rice parameter (i.e., cRiceParam) multiplied (i.e., left shifted, "<<") by a constant parameter value (PARAM1).

The HEVC standard would be defined as follows.

$c$RiceParam=Min($c$LastRiceParam+($c$LastAbsLevel>>(PARAM1*(2<<$c$LastRiceParam))), MAX_RICE_PARAM)

In one example of the disclosure, PARAM1 is set equal to 1 and MAX_RICE_PARAM is set equal to 4. As described above in the first example of this disclosure, these parameters may be signaled by video encoder 20 to video decoder 30, or may be derived by video decoder 30 without signaling. For example, MAX_RICE_PARAM may be set equal to 4 for lossy coding and set equal to 5 for lossless coding (i.e., when the cu_transquant_bypass_flag is on).

In one example, using the example values given above, the C-code formula for the Rice parameter update scheme of this disclosure would be as follows.

$c$RiceParam=min<$U$Int>(($c$RiceParam+(absCoeff>>
(2<<$c$RiceParam))),4);

Equivalently, the HEVC standard would be defined as follows.

$c$RiceParam=Min($c$LastRiceParam+($c$LastAbsLevel>>(2<<$c$LastRiceParam)),4)

It should be noted that the Rice parameter update as presented in JCTVC-M0316 only increases the value of the Rice parameter by 1 or sets the Rice parameter equal to its maximum value of 4 or 5 depending on a condition. The techniques of this disclosure can increase the amount of the variable increment at any update by any integer value, i.e., 1, 2, 3 or more, up to the maximum value of the Rice parameter. In some examples, the maximum value of the Rice parameter may be an integer value that is greater than or equal to 4. In one specific example, the maximum value of the Rice parameter is equal to 7. The amount of the variable increment may depend on the absolute value of the coefficient being coded. In one example, based on the coefficient level for the coefficient being decoded having a large absolute value, the variable increment may be determined to have an integer value greater than one. As such, the techniques of this disclosure allow for more adaptation capacity.

In addition, as noted above, the functions representing the HEVC update process and the update process of JCTVC-M0316, the "?" is equivalent to an "if" conditional statement. The techniques described in this disclosure do not require performance of any conditional operations. Conditional operations may be processing and time intensive in the critical loop of coefficient entropy coding, and removal of the "if" conditional statement may improve efficiency.

Also, it should be noted that this capacity to increase the Rice parameter by different amounts may be also achieved by look-up tables. For example, a look-up table may used in which the inputs to the look-up table are the value of the Rice parameter and the absolute value of the coefficient level for the coefficient being decoded, and the output of the look-up table is the amount of the variable increment to be applied to the value of the Rice parameter, which may be different from the conventional increment of 0 and 1.

A combination of any of the examples given above may be used. For example, the parameters in any of the examples given above may be signaled by video encoder 20 to video decoder 30, or derived by video decoder 30 without signaling, as described above. The techniques of this disclosure may be particularly suited to data that is losslessly coded or coded with different transforms than in the HEVC standard, due to the different coefficient statistics observed in those situations. As one specific example, the Rice parameter update equation cRiceParam=Min(cLastRiceParam+(cLastAbsLevel>>(2<<cLastRiceParam)), 4) may be used for CGs for which a transform is not applied, i.e., in the case of lossless coding or for lossy coding with transform skipping or bypass; otherwise, the HEVC Rice parameter update method is applied. Another situation in which the techniques of this disclosure may provide more gains is for very high bit rate (i.e., high quality) video coding. The techniques of the disclosure, therefore, may be applied depending on the target bit-rate, target peak signal-to-noise ratio (PSNR), or the quantization step or quantization parameter (QP) in which the residual video data is coded.

The techniques of this disclosure include variants of the Rice parameter update scheme described above, the C-code formula for which is repeated below.

$$cRiceParam=min<UInt>((cRiceParam+(absCoeff>>(PARAM1*(2<<cRiceParam)))),MAX\_RICE\_PARAM);$$

In one example of the techniques of this disclosure, the basic formula above can be extended to obtain different threshold values for the absolute value of the coefficient for which the Rice parameter is increased. Parameter values may be added to the absolute value of the coefficient being coded (i.e., absCoeff), or added to or multiplied the value by which the right-shift operation of the absolute value is performed. An example of the C-code formula is given as:

$$cRiceParam=min<UInt>((cRiceParam+((absCoeff+P1)>>(P2+P3*(P4<<cRiceParam)))),MAX\_RICE\_PARAM);$$

where the parameter values are P1, P2, P3 and P4, which are integer values, and where ((absCoeff+P1)>>(P2+P3*(P4<<cRiceParam))) defines a variable increment of the value of the Rice parameter that is determined based on the value of the Rice parameter (i.e., cRiceParam) and an absolute value of a coefficient level for the coefficient being coded (i.e., absCoeff). In this example, the variable increment is determined based on a right shifted version of the absolute value of the coefficient level for the coefficient being coded (i.e., absCoeff), where an amount of the right shift is based on the value of the Rice parameter (i.e., cRiceParam). The parameter MAX_RICE_PARAM sets the maximum value that the Rice parameter can achieve.

As shown in the above example, P1 may be added to the absolute value of the coefficient level for the coefficient being coded (i.e., absCoeff), P2 may be added to a value by which the right-shift operation of the absolute value is performed (i.e., (P4<<cRiceParam)), P3 may multiply a value by which the right-shift operation of the absolute value is performed (i.e., (P4<<cRiceParam)). The parameter value P4 and the value of the Rice parameter (i.e., cRiceParam) may determine the value by which the right-shift operation of the absolute value is performed.

Equivalently, the HEVC standard may be defined for this last case as follows.

$$cRiceParam=Min(cLastRiceParam+((cLastAbsLevel+P)>>(P2+P3*(P4<<cLastRiceParam))),MAX\_RICE\_PARAM)$$

In one implementation of this formula, the parameter values are set to be P1=0, P2=1, P3=1, P4=1 and MAX_RICE_PARAM=4. The HEVC text for this specific case is as follows.

$$cRiceParam=Min(cLastRiceParam+(cLastAbsLevel>>(1+(1<<cLastRiceParam))),4)$$

In the example where MAX_RICE_PARAM is equal to 5, performance results may be improved for the lossless coding of screen content. For even greater performance in the case of lossless coding of screen content, MAX_RICE_PARAM may be set equal to 7.

In another example, by adding a condition, the impact on the amount of the right shift applied to the absolute value by the value of the Rice parameter may be limited as follows.

$$cRiceParam=Min(cLastRiceParam+((cLastAbsLevel+P1)>>(P2+P3*(P4<<(cLastRiceParam>P5?P5:cLastRiceParam))),MAX\_RICE\_PARAM)$$

In the above example, the Rice parameter update scheme is modified to include the condition (cLastRiceParam>P5 ?P5: cLastRiceParam), in which the righ-shift amount by the Rice parameter is limited to the value of P5 when the value of the Rice parameter is greater than P5. In one implementation, the parameter values are set to be P1=0, P2=1, P3=1, P4=1, P5=0 and MAX_RICE_PARAM=4. The HEVC text for this specific case is as follows.

$$cRiceParam=Min(cLastRiceParam+(cLastAbsLevel>>(2<<(cLastRiceParam>0?1:0))),4)$$

In this case, the amount of the right shift applied to the absolute value is the same, i.e., equal to 1, for any Rice Parameter that is greater than or equal to 1 (i.e., greater than 0).

Different processes for updating the value of the Rice parameter may be used under different conditions. The Rice parameter update methods described in this disclosure may be applied depending on whether a transform is applied to a transform block that includes the CG being coded. A video coding device, such as video encoder 20 or video decoder 30, may determine whether the transform is applied to the transform block based on one or more of the following: a lossless coding status, a transform bypass status, a transform skip status, or a profile set in a parameter set, such as the SPS. A profile set that uses the Rice parameter update scheme of this disclosure may be a profile for the range extensions 4:4:4 of HEVC or a profile devoted to screen content, but other profiles might use the HEVC Rice parameter update scheme.

In one example, the condition based on whether a transform is applied to a transform block that includes the CG may be presented as follows.

If transform_skip_flag is equal to 1 or cu_transquant_bypass_flag is equal to 1, the variable cRiceParam is derived from cLastAbsLevel and cLastRiceParam as:

$$cRiceParam=Min(cLastRiceParam+(cLastAbsLevel>>(1+(<<cLastRiceParam))),4)$$

Otherwise, the variable cRiceParam is derived from cLastAbsLevel and cLastRiceParam as:

$$cRiceParam=Min(cLastRiceParam+(cLastAbsLevel>(3*(1<<cLastRiceParam))?1:0),4)$$

Accordingly, one variant of the Rice parameter update scheme of this disclosure may be applied when the transform is not applied, i.e., in the case of lossless coding or lossy coding with transform skip, and the HEVC Rice parameter update scheme may be applied when the transform is applied, i.e., in the case of lossy coding of quantized transform coefficients.

The techniques of this disclosure include additional variants of the Rice parameter update scheme described above, the C-code formula for which is repeated below.

cRiceParam=min<$UInt$>((cRiceParam+(absCoeff>>(PARAM1*(2<<cRiceParam)))),MAX_RICE_PARAM);

The techniques of this disclosure further describe methods to decrease the value of the Rice parameter and to set or initialize the Rice parameter at the beginning of each CG.

In one example of the techniques of this disclosure, the basic formula above can be extended to obtain different threshold values for the absolute value of the coefficient for which the Rice parameter is increased, and to remove a multiplication operation (i.e., a left bit-shift operation, "<<"). An example of the C-code formula is given as:

cRiceParam=min((cRiceParam+((absCoeff+P1)>>(P2+P3*cRiceParam))),MAX_RICE_PARAM);

where the parameter values are P1, P2 and P2, which are integer values, and where ((absCoeff+P1)>>(P2+P3*cRiceParam)) defines a variable increment of the value of the Rice parameter that is determined based on the value of the Rice parameter (i.e., cRiceParam) and an absolute value of a coefficient level for the coefficient being coded (i.e., absCoeff). In this example, the variable increment is determined based on a right shifted version of the absolute value of the coefficient level for the coefficient being coded (i.e., absCoeff), where an amount of the right shift is based on the value of the Rice parameter (i.e., cRiceParam). The parameter MAX_RICE_PARAM sets the maximum value that the Rice parameter can achieve.

As shown in the above example. P1 may be added to the absolute value of the coefficient level for the coefficient being coded (i.e., absCoeff), P2 may be added to the value of the Rice parameter (i.e., cRiceParam) by which the right-shift operation of the absolute value is performed, P3 may multiply the value of the Rice parameter (i.e., cRiceParam) by which the right-shift operation of the absolute value is performed.

The HEVC standard would be defined as follows.

cRiceParam=Min(cLastRiceParam+((cLastAbsLevel+P1)>>(P2+P3*cLastRiceParam)),MAX_RICE_PARAM)

In one implementation of the above example update method, the parameter values are set to be P1=0, P2=2, and P3=1, and MAX_RICE_PARAM=4. These parameters may be signaled by video encoder 20 to video decoder 30, or the parameters may be derived by video decoder 30 without signaling. In some examples, MAX_RICE_PARAM may be set equal to 4 for lossy coding and set equal to 5 for lossless coding. In some other examples, MAX_RICE_PARAM may be set equal to 7.

An example of the C-code formula for the Rice parameter update scheme of this disclosure using the above default values is as follows.

cRiceParam=min((cRiceParam+(absCoeff>>(2+cRiceParam))),4);

Equivalently, the HEVC standard would be defined for this last case as follows.

cRiceParam=Min(cLastRiceParam+(cLastAbsLevel>>(2+cLastRiceParam)),4)

In another example, the amount an amount of the variable increment at each update of the value of the Rice parameter may be capped. For example, an additional restriction may be imposed in which the value of the Rice parameter may increase by at most a maximum increment value (i.e., MAX_INCREMENT) at each update (i.e., for each coefficient level coded using Golomb codes defined by the Rice parameter). An example formula for the capped Rice parameter update scheme may be as follows.

increment=Min((cLastAbsLevel>>(2+cLastRiceParam)),MAX_INCREMENT)cRiceParam=Min(cLastRiceParam+increment, MAX_RICE_PARAM)

In other examples, instead of capping the amount of the variable increment at each update of the value of the Rice parameter to MAX_INCREMENT, a damping factor by which the variable increment is scaled is be introduced. An example of the dampened Rice parameter update scheme may be as follows.

increment=⌊damp_fact*(cLastAbsLevel>>(2+cLastRiceParam))⌋cRiceParam=Min(cLastRiceParam+increment,MAX_RICE_PARAM)

In some examples, the damping factor (i.e., damp_fact) is less than or equal to 1.

This concept of capping the maximum increment of cRiceParam in one update step or damping the amount of increment may be applied to any of the examples of the Rice parameter update scheme described in this disclosure. The same concept may also be applied to cap or dampen a decrement of the value of the Rice parameter in cases where the Rice parameter is allowed to decrease, as described in more detail below. The techniques described above may be applied to CGs in all blocks or only CGs in blocks for which a transform is not applied, i.e., for lossless coding or lossy coding with transform skipping or bypass.

The Rice parameter update techniques described above may not allow for the Rice parameter to decrease over a CG. Instead, the update function has been described as an increasing function. The techniques of this disclosure further include a Rice parameter update method that allows the value of the Rice parameter to decrease in some cases. In general terms, the Rice parameter update scheme that allows both incrementing and decrementing of the Rice parameter may be expressed as:

cRiceParam=$F_1$(cRiceParam,absCoeff)

where $F_1$ is a function that under some input values of the Rice parameter (i.e., cRiceParam) and the absolute value of the coefficient level for the coefficient being coded (i.e., absCoeff) may be decreasing such that the output value of cRiceParam is smaller than the input value of cRiceParam.

In a more specific example, the update scheme may be described as:

```
If ( F_2 ( cRiceParam, absCoeff ) )
    cRiceParam = cRiceParam + F_3( cRiceParam, absCoeff );
else
    cRiceParam = cRiceParam - F_4( cRiceParam, absCoeff );
``` where a condition is tested on function $F_2$, and functions $F_3$ and $F_4$ take as inputs cRiceParam and absCoeff, and potentially other inputs such as statistics of previous CGs) and output values of the Rice parameter that are greater than or equal to 0.

In one implementation of the above example update scheme, the simple functions $F_2$, $F_3$ and $F_4$ are each defined as follows:

```
If (absCoeff >= (P1*cRiceParam+P2))
    cRiceParam = min((cRiceParam+(absCoeff >> (2+cRiceParam))),
        MAX_RICE_PARAM);
else
    cRiceParam = max(cRiceParam - 1, 0);
``` where P1 and P2 are parameter values. In one example, the parameter values may be set as P1=1, P2=0, and MAX_RICE_PARAM=4 to provide good coding performance gains. In other examples, particularly for lossless coding, the maximum value of the Rice parameter may be set equal to an integer value that is greater than 4, such as 5 or 7.

In the above example, a conditional operation may be performed to determine whether the absolute value of the coefficient level for the current coefficient being coded (i.e., absCoeff) is greater than or equal to the value of the Rice parameter (i.e., cRiceParam). If the absolute value of the coefficient level for the current coefficient is greater than or equal to the value of the Rice parameter, then the value of the Rice parameter may be updated based on the selection of the minimum of either the maximum value of the Rice parameter or the variable increment of the value of the Rice parameter, as described in detail above. If the absolute value of the coefficient level for the current coefficient is less than the value of the Rice parameter, then the value of the Rice parameter may be updated based on a selection of a maximum of either zero or a decrement of the value of the Rice parameter.

The above example of the Rice parameter update scheme that allows both incrementing and decrementing of the Rice parameter may include one additional conditional operation (i.e., an if/else condition) to decide whether to increase or decrease the Rice parameter. The technique, however, is based on the Rice parameter update scheme of this disclosure in which a condition is removed with respect to the HEVC Rice parameter update scheme such that the total number of conditions remains the same as in the HEVC scheme. In some examples, other Rice parameter update methods may be modified to either increment or decrement the Rice parameter.

Additionally, in the case of lossy coding with transform skip, the decrement of the value of the Rice parameter may only be applied to the transform-skip blocks as follows:

```
If ( absCoeff >= cRiceParam || transform_skip_flag )
    cRiceParam = min((cRiceParam+(absCoeff >>(2 + cRiceParam))), 4);
else
    cRiceParam = cRiceParam - 1;
``` where the transform_skip_flag signals whether the transform has been skipped for the CG or the transform block of the CG.

In the above examples, the Rice parameter may decrease only by 1. In other examples, the function F4 may be chosen so that the Rice parameter may decrease by more than 1 if the current value of the Rice parameter is large and the absolute value of the current coefficient is small.

The techniques of this disclosure have thus far been focused on updating a value of the Rice parameter while coding a CG or block of coefficients. The following example describes techniques for initializing a value of the Rice parameter at the beginning of a CG. Conventionally, in the HEVC standard, the Rice parameter is reset to a value of 0 after coding the remaining absolute values of coefficients in a CG (e.g., a 4×4 transform block or a 4×4 sub-block in a transform block). In the case of coding coefficient levels for screen content or in the case of lossless coding or lossy coding with transform skipping or bypass, initializing the value of the Rice parameter to zero may not be optimal. The techniques of this disclosure may initialize or set the value of the Rice parameter to a non-zero value at the beginning of each CG of a transform block.

As one example of the Rice parameter initialization scheme of this disclosure, the Rice parameter is not reset after coding a CG. According to the techniques of this disclosure, the value of the Rice parameter for a subsequent CG is instead set to the same value obtained for the Rice parameter at the end of coding the current CG. As in the HEVC initialization scheme, the value may be set equal to 0 at the beginning of the subsequent CG. Unlike the HEVC scheme, however, the value of the Rice parameter is not required to be set to 0.

As another example of the Rice parameter initialization scheme of this disclosure, the value of the Rice parameter for a subsequent CG is set to a value that is based on the value of the Rice parameter after coding the current CG. In a specific example, the Rice parameter at the beginning of each CG is set as follows.

$c$RiceParam=max(0,$c$RiceParam−1);

In the above example, the value of the Rice parameter is initialized for the subsequent CG based on a selection of a maximum of either zero or a decrease in the value of the Rice parameter after coding the current CG. In some other examples, the initialization value of the Rice parameter may be capped, as in the following example.

$c$RiceParam=min(2,max(0,$c$RiceParam−1));

In this example, the initialization value of the Rice parameter is capped to be no greater than 2.

In some examples, values other than 1 may be used to reduce the current value of the Rice parameter (e.g., the value n), including subtracting 2 (i.e., n equals 2) rather than 1 from the current value of the Rice parameter. For example, the value of the decrease for initializing the Rice parameter may be variable based on whether the subsequent CG is included in a transform block for which a transform is applied. An example formula may be as follows.

```
if(transform_skip_flag)
    cRiceParam = max(0, cRiceParam - 1);
else
    cRiceParam = max(0, cRiceParam - 2);
```

The example cases of the Rice parameter initialization scheme described in this disclosure may be applied to CGs included in all transform blocks or may be applied to CGs based on whether a transform is applied to the transform block. For example, in the case of a transform block with transform skipping or transform bypass, the Rice parameter value may not be reset to 0 for a subsequent CG in the block, but for transform blocks for which the transform has been applied, the Rice parameter may be reset to 0 for a subsequent CG in the block.

For example, in the case of lossy coding with transform skip, the decrease in the value of the Rice parameter for initialization for a subsequent CG may be applied only for CGs in transform-skip blocks. As example formula may be as follows.

```
if(transform_skip_flag)
    cRiceParam = max(0, cRiceParam − 1);
else
    cRiceParam = 0
```

In general, this disclosure describes techniques for adjusting the value of the Rice parameter used to define Golomb codes for coefficient level coding based on whether a transform is applied to a transform block that includes the CG. According to this disclosure, adjusting the value of the Rice parameter may include updating the value of the Rice parameter to define the Golomb codes for coding a remaining absolute value of a coefficient level for a subsequent coefficient in the CG, or initializing the value of the Rice parameter to define the Golomb codes for coding a remaining absolute value of a coefficient level for at least one coefficient in a subsequent CG.

For example, if a transform is not applied to a transform block, i.e., in the case of transform skip or bypass, the Rice parameter update scheme described in this disclosure may be used to update the value of the Rice parameter for a subsequent coefficient in the CG. Otherwise, if the transform is applied to the transform block, the HEVC Rice parameter update scheme may be used to update the value of the Rice parameter for a subsequent coefficient in the CG. In a further example, if the transform is not applied to the transform block, the value of the Rice parameter may be initialized for a subsequent CG in the transform block based on the value of the Rice parameter after coding the current CG. Otherwise, if the transform is applied to the transform block, the value of the Rice parameter may be initialized to be equal to zero for a subsequent CG in the transform block.

Although the example methods of adjusting a value of the Rice parameter, e.g., Rice parameter update and initialization schemes are described separately above, the techniques of this disclosure are not so limited. In general, various combinations of the example techniques described above may be possible. The example methods described above may also be implemented separately. In addition, all of the methods described above or their combinations may be applied to CG within all transform blocks or only transform blocks for which a transform is skipped or bypassed.

Figure 5:
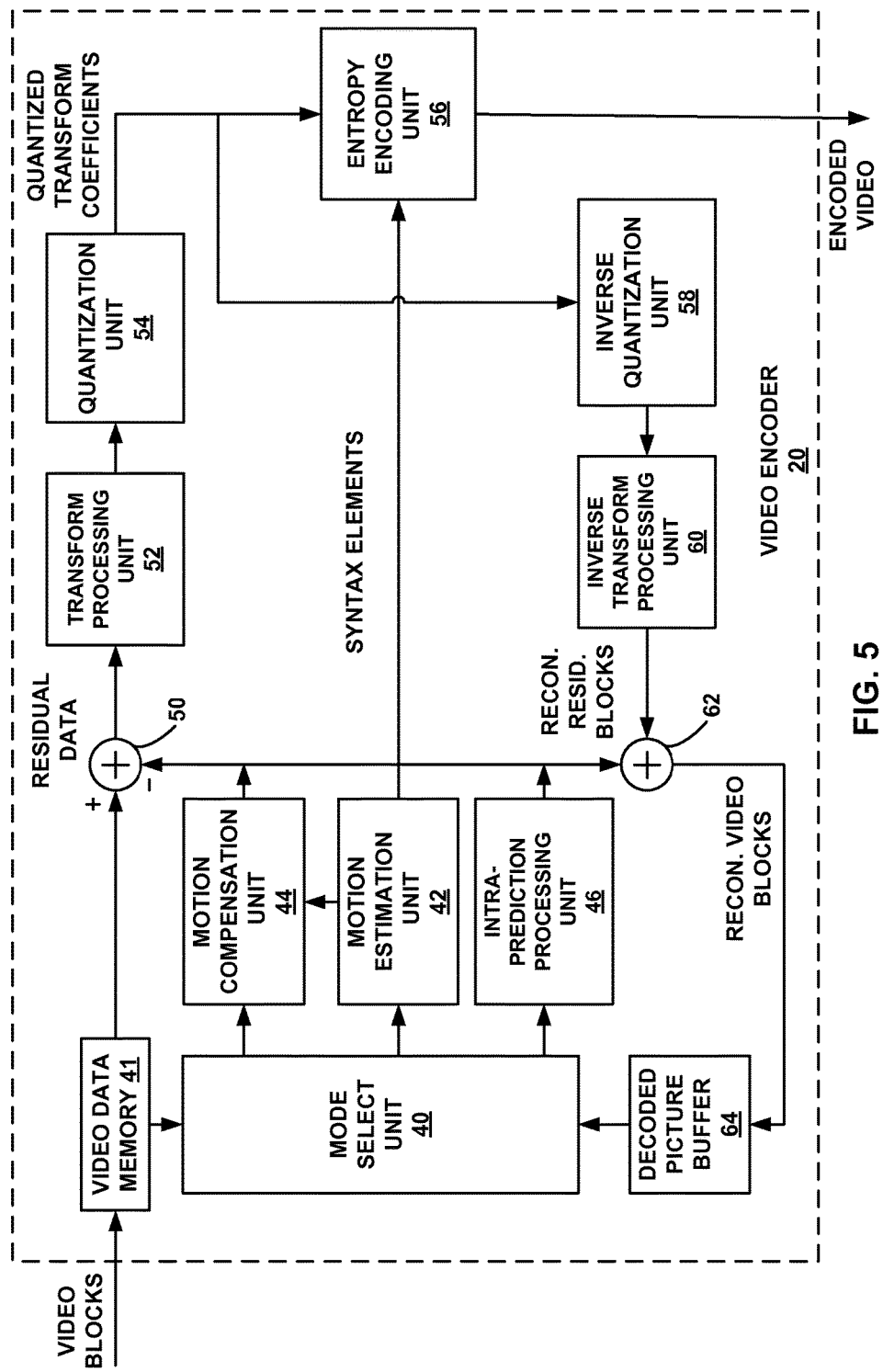
FIG. 5 is a block diagram illustrating an example video encoder that may implement the techniques for encoding coefficient levels described in this disclosure.

FIG. 5 is a block diagram illustrating an example of video encoder 20 that may implement the techniques for encoding coefficient levels described in this disclosure. Video encoder 20 will be described in the context of HEVC coding for purposes of illustration, but without limitation of this disclosure as to other coding standards or methods that may require scanning of transform coefficients. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 5, the video encoder 20 receives a current video block within a video frame to be encoded. In the example of FIG. 5, the video encoder 20 includes a mode select unit 30, a video data memory 41, a motion compensation unit 44, a motion estimation unit 42, an intra-prediction processing unit 46, a decoded picture buffer (DPB) 64, a summer 50, a transform processing unit 52, a quantization unit 54, and an entropy encoding unit 56. The transform processing unit 52 illustrated in FIG. 5 is the unit that applies the actual transform or combinations of transform to a block of residual data, and is not to be confused with a block of transform coefficients, which also may be referred to as a transform unit (TU) of a CU. For video block reconstruction, the video encoder 20 also includes an inverse quantization unit 58, an inverse transform processing unit 60, and a summer 62. A deblocking filter (not shown in FIG. 5) may also be included to filter block boundaries to remove blockiness artifacts from reconstructed video. If desired, the deblocking filter would typically filter the output of the summer 62.

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction processing unit 46 may perform intra-predictive coding of the received video block relative to one or more neighboring blocks in the same frame or slice as the block to be coded to provide spatial compression.

The mode select unit 40 may select one of the coding modes, intra or inter, e.g., based on error (i.e., distortion) results for each mode, and provides the resulting intra- or inter-predicted block (e.g., a prediction unit (PU)) to the summer 50 to generate residual block data and to the summer 62 to reconstruct the encoded block for use in a reference picture. Summer 62 combines the predicted block with inverse quantized, inverse transformed data from inverse transform processing unit 60 for the block to reconstruct the encoded block, as described in greater detail below. Some video frames may be designated as I-frames, where all blocks in an I-frame are encoded in an intra-prediction mode. In some cases, the intra-prediction processing unit 46 may perform intra-prediction encoding of a block in a P- or B-frame, e.g., when the motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference picture stored in decoded picture buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU. e.g., by retrieving the reference sample identified by a motion vector for the PU.

The intra-prediction processing unit 46 may intra-predict the received block, as an alternative to inter-prediction performed by the motion estimation unit 42 and the motion compensation unit 44. The intra-prediction processing unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction processing unit 46 may be configured with a variety of different intra-prediction modes. For example, the intra-prediction processing unit 46 may be configured with a certain number of directional prediction modes, e.g., thirty-three directional prediction modes, based on the size of the CU being encoded.

The intra-prediction processing unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction processing unit 46 may calculate an error value for the prediction mode based on pixel differences between the PU and the received block to be encoded. The intra-prediction processing unit 46 may continue testing intra-prediction modes until an intra-prediction mode that yields an acceptable error value is discovered. The intra-prediction processing unit 46 may then send the PU to the summer 50.

The video encoder 20 forms a residual block by subtracting the prediction data calculated by the motion compensation unit 44 or the intra-prediction processing unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform processing unit 52 may form one or more transform units (TUs) from the residual block. The transform processing unit 52 selects a transform from among a plurality of transforms. The transform may be selected based on one or more coding characteristics, such as block size, coding mode, or the like. The transform processing unit 52 then applies the selected transform to the TU, producing a video block comprising a two-dimensional array of transform coefficients. The transform processing unit 52 may send the resulting transform coefficients to the quantization unit 54. The quantization unit 54 may then quantize the transform coefficients.

The entropy encoding unit 56 may then perform a scan of the coefficients in the matrix according to a scanning mode. In the case of lossy coding, the coefficients may be quantized transform coefficients. In the case of lossless coding or lossy coding with transform skipping or bypass, the coefficients may be coefficients that have not been transformed or quantized. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as CABAC, syntax-based context-adaptive binary arithmetic coding (SBAC), Probability Interval Partitioning Entropy (PIPE), or another entropy coding methodology to the coefficients. Entropy encoding unit 56 may be configured to code the coefficients according to the techniques of this disclosure. In the example of CABAC, entropy encoding unit 56 may encode the coefficients using either regular coding mode or bypass mode. To perform CABAC, the entropy encoding unit 56 may select a context model to apply a certain context to encode symbols to be transmitted. The context may relate to, for example, whether neighboring values are non-zero or not. Entropy encoding unit 56 may select the context model used to encode these symbols based on, for example, an intra-prediction direction for intra-prediction modes, a scan position of the coefficient corresponding to the syntax elements, block type, and/or transform type, among other factors used for context model selection.

Entropy encoding unit 56 encodes coefficient levels of residual video data into a bitstream for transmission to a video decoder or a storage device. In the case of lossless video coding or lossy video coding with transform skipping or bypass, the coefficients to be encoded may have coefficient levels with large absolute values. When the coefficients represent screen content, which may include graphics and text regions, the content may not be well predicted resulting in large absolute values of coefficient levels for the coefficients to be encoded.

Entropy encoding unit 56 encodes a remaining absolute value (e.g., coeff_abs_level_remaining or levelRem) of a coefficient level for at least one coefficient in a coefficient group (CG) in bypass mode using Golomb codes defined by a Rice parameter. According to the techniques of this disclosure, entropy encoding unit 56 is configured to update a value of the Rice parameter based on a selection of a minimum of either a maximum value of the Rice parameter or a variable increment of the value of the Rice parameter. An amount of the variable increment is determined based on the value of the Rice parameter and an absolute value of the coefficient level for the current coefficient being encoded.

The variable increment enables the value of the Rice parameter to increase by any integer value up to the maximum value of the Rice parameter. Example equations representing the Rice parameter update are described in more detail above. The Rice parameter update scheme described in this disclosure allows the Rice parameter to quickly and efficiently adapt to large coefficient values, which may occur in blocks of screen content and blocks with transform skipping or bypass.

In some examples, entropy encoding unit 56 may be further configured to adjust the value of the Rice parameter used to define Golomb codes for coefficient level coding based on whether a transform is applied to a transform block that includes the CG. According to the techniques described in this disclosure, when the transform is not applied to the transform block, i.e., in the case of transform skip or bypass, entropy encoding unit 56 may perform Rice parameter update and Rice parameter initialization schemes that are flexible to adapt to large absolute values of coefficient levels for the coefficients of the CG. On the other hand, when the transform is applied to the transform block, entropy encoding unit 56 may apply the HEVC Rice parameter update and initialization schemes, which are optimized for the small coefficient values of transformed coefficients.

Following the entropy coding by the entropy encoding unit 56, the resulting encoded video may be transmitted to another device, such as the video decoder 30, or archived for later transmission or retrieval. In some cases, the entropy encoding unit 56 or another unit of the video encoder 20 may be configured to perform other coding functions, in addition to entropy coding. For example, the entropy encoding unit 56 may be configured to determine coded block pattern (CBP) values for CUs and PUs. Also, in some cases, the entropy encoding unit 56 may perform run length coding of coefficients.

The inverse quantization unit 58 and the inverse transform processing unit 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the reference pictures of decoded picture buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block for storage in decoded picture buffer 64. The reconstructed video block may be used by the motion estimation unit 42 and the motion compensation unit 44 as a reference block to inter-code a block in a subsequent video frame.

Figure 6:
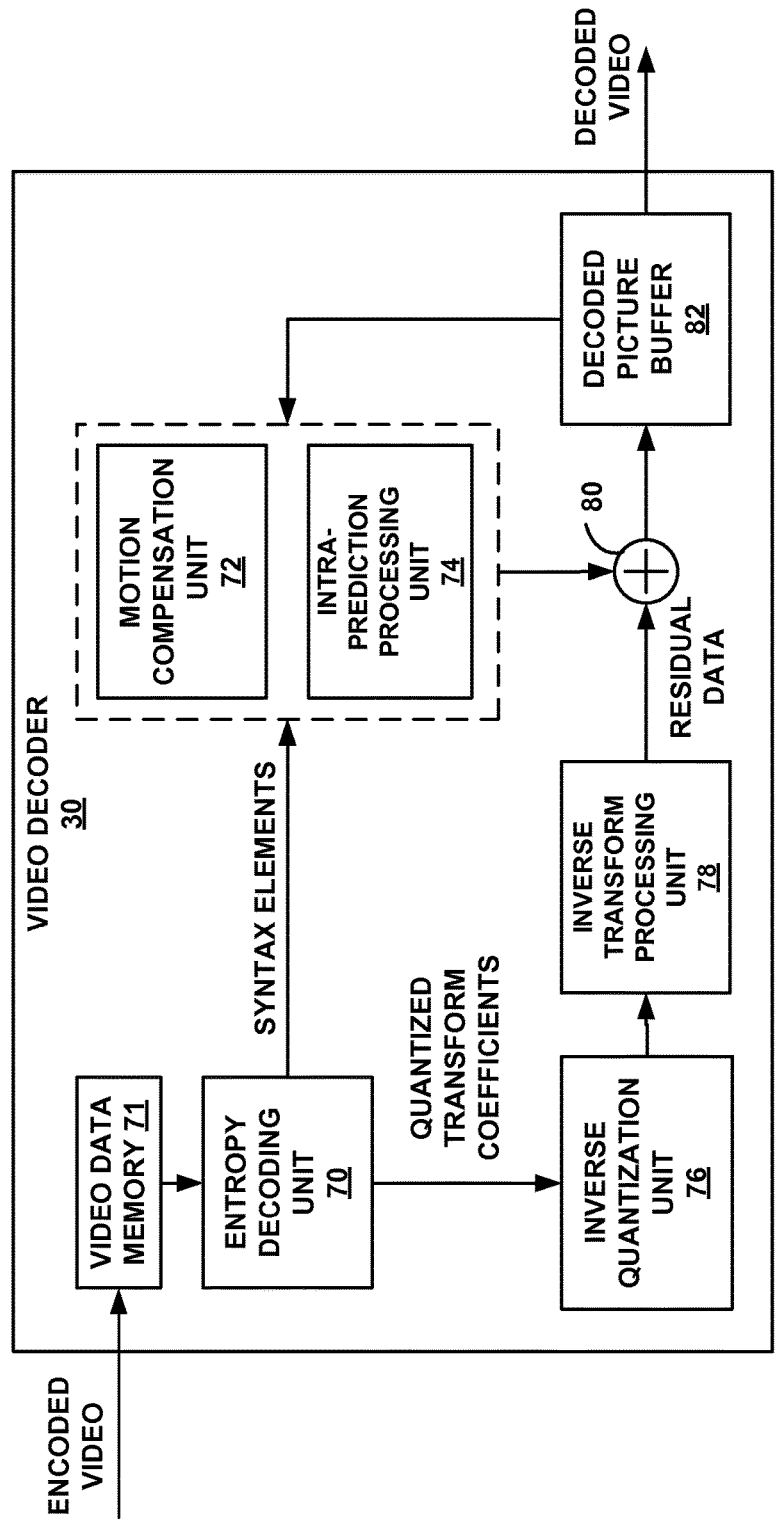
FIG. 6 is a block diagram illustrating an example video decoder that may implement the techniques for decoding coefficient levels described in this disclosure.

FIG. 6 is a block diagram illustrating an example of video decoder 30 that may implement the techniques for decoding coefficient levels described in this disclosure. In the example of FIG. 6, the video decoder 30 includes an entropy decoding unit 70, a video data memory 71, a motion compensation unit 72, an intra-prediction processing unit 74, an inverse quantization unit 76, an inverse transformation unit 78, a decoded picture buffer (DPB) 82 and a summer 80. The video decoder 30 may, in some examples, perform a decoding pass generally reciprocal to the encoding pass described with respect to the video encoder 20 (see FIG. 5).

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71 and decoded picture buffer 82 may be provided by the same memory device or separate memory devices. In various examples, video data memory 71 may be on-chip with other components of video decoder 30, or off-chip relative to those components.

Entropy decoding unit 70 performs an entropy decoding process on the encoded bitstream to retrieve a one-dimensional array of residual video data coefficients. The entropy decoding process used depends on the entropy coding used by the video encoder 20 (e.g., CABAC). The entropy coding process used by the encoder may be signaled in the encoded bitstream or may be a predetermined process. Entropy decoding unit 70 may be configured to decode the coefficients according to the techniques of this disclosure. In the example of CABAC, entropy decoding unit 70 may decode the coefficients using either regular coding mode or bypass mode.

In some examples, entropy decoding unit 70 may scan the received values using a scan mirroring the scanning mode used by the entropy encoding unit 56 of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

Entropy decoding unit 70 decodes coefficient levels of the residual video data coefficients from the bitstream in a reciprocal manner to video encoder 20. In the case of lossy video coding, the coefficients to be decoded may be quantized transform coefficients. In the case of lossless video coding or lossy video coding with transform skipping or bypass, the coefficients to be decoded may have coefficient levels with large absolute values. When the coefficients represent screen content, which may include graphics and text regions, the content may not be well predicted resulting in large absolute values of coefficient levels for the coefficients to be decoded.

Entropy decoding unit 70 decodes a remaining absolute value of a coefficient level for at least one coefficient in a coefficient group (CG) using Golomb codes defined by a Rice parameter. According to the techniques of this disclosure, entropy decoding unit 70 is configured to update a value of the Rice parameter based on a selection of a minimum of either a maximum value of the Rice parameter or a variable increment of the value of the Rice parameter. An amount of the variable increment is determined based on the value of the Rice parameter and an absolute value of the coefficient level for the current coefficient being decoded.

The variable increment enables the value of the Rice parameter to increase by any integer value up to the maximum value of the Rice parameter. Example equations representing the Rice parameter update are described in more detail above. The Rice parameter update scheme described in this disclosure allows the Rice parameter to quickly and efficiently adapt to large coefficient values, which may occur in blocks of screen content and blocks with transform skipping or bypass.

In some examples, entropy decoding unit 70 may be further configured to adjust the value of the Rice parameter used to define Golomb codes for coefficient level coding based on whether a transform is applied to a transform block that includes the CG. According to the techniques described in this disclosure, when the transform is not applied to the transform block, i.e., in the case of transform skip or bypass, entropy decoding unit 70 may perform Rice parameter update and Rice parameter initialization schemes that are flexible to adapt to large absolute values of coefficient levels for the coefficients of the CG. On the other hand, when the transform is applied to the transform block, entropy decoding unit 70 may apply the HEVC Rice parameter update and initialization schemes, which are optimized for small coefficient values of transformed coefficients.

The inverse quantization unit 76 inverse quantizes, i.e., de-quantizes, quantized transform coefficients provided in the bitstream and decoded by entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. Inverse quantization unit 76 may inverse quantize the transform coefficients either before or after the coefficients are converted from a one-dimensional array to a two-dimensional array.

Inverse transform processing unit 78 applies an inverse transform to the inverse quantized transform coefficients. In some examples, inverse transform processing unit 78 may determine an inverse transform based on signaling from video encoder 20, or by inferring the transform from one or more coding characteristics such as block size, coding mode, or the like. In some examples, inverse transform processing unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, inverse transform processing unit 78 may apply a cascaded inverse transform, in which inverse transform processing unit 78 applies two or more inverse transforms to the transform coefficients of the current block being decoded.

Intra-prediction processing unit 74 may generate prediction data for a current block of a current frame based on a signaled intra-prediction mode and data from previously decoded blocks of the current frame.

Motion compensation unit 72 may retrieve the motion vector, motion prediction direction and reference index from the encoded bitstream. The reference prediction direction indicates whether the inter-prediction mode is uni-directional (e.g., a P frame) or bi-directional (a B frame). The reference index indicates which reference frame the candidate motion vector is based on. Based on the retrieved motion prediction direction, reference frame index, and motion vector, motion compensation unit 72 produces a motion compensated block for the current portion. These motion compensated blocks essentially recreate the predictive block used to produce the residual data.

Motion compensation unit 72 may produce the motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Additionally, motion compensation unit 72 and intra-prediction processing unit 74, in an HEVC example, may use some of the syntax information (e.g., provided by a quadtree) to determine sizes of LCUs used to encode frames of the encoded video sequence. Motion compensation unit 72 and intra-prediction processing unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction processing unit 74 to form decoded blocks. If desired, a deblocking filter may also be applied to filter the decoded blocks in order to remove blockiness artifacts. The decoded video blocks are then stored in decoded picture buffer 82, which provides reference blocks for subsequent motion compensation and also produces decoded video for presentation on a display device (such as the display device 32 of FIG. 1).

Figure 7:
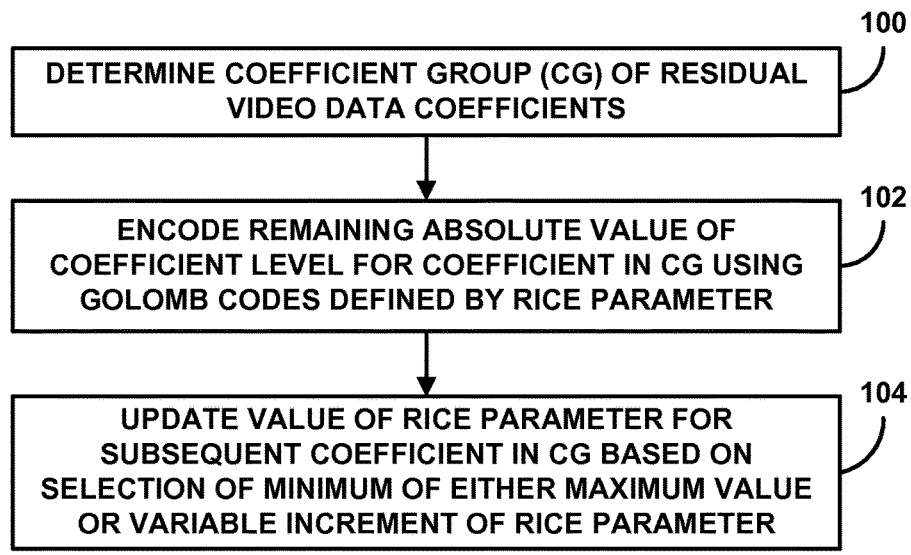
FIG. 7 is a flowchart illustrating an example operation of updating a value of a Rice parameter during entropy encoding of coefficient levels according to techniques described in this disclosure.

FIG. 7 is a flowchart illustrating an example operation of updating a value of a Rice parameter during entropy encoding of coefficient levels according to techniques described in this disclosure. The example operation is described with respect to video encoder 20 including entropy encoding unit 56 from FIG. 5.

Entropy encoding unit 56 receives coefficients of residual video data to be encoded into a bitstream for transmission to video decoder 30 or for storage on storage medium 34 or file server 36. Upon receiving the residual video data coefficients for encoding, entropy encoding unit 56 determines a block or coefficient group (CG) of the coefficients (100). The CG may be a subblock of a transform block, such as an n×n (e.g., 4×4) subblock as illustrated in FIG. 4.

As described above in more detail, entropy encoding unit 56 may perform one or more scans of the CG according to an inverse scan order to encode coefficient levels of the coefficients in the CG. For example, entropy encoding unit 56 may encode flags or syntax elements to indicate whether the coefficients have coefficient levels with absolute values that are greater than 1 or greater than 2 using context models in a regular coding mode. Entropy encoding unit 56 then encodes a flag or a syntax element to indicate a remaining absolute value of a coefficient level for at least one of the coefficients in the CG using Golomb codes defined by a Rice parameter (102). For example, entropy encoding unit 56 may encode a syntax element indicating a remaining absolute value of a coefficient level for any of the coefficients with coefficient levels greater than 2 in bypass mode.

According to the techniques of this disclosure, entropy encoding unit 56 updates a value of the Rice parameter based on a selection of a minimum of either a maximum value of the Rice parameter or a variable increment of the value of the Rice parameter (104). As described in detail above, an amount of the variable increment is determined based on the value of the Rice parameter and an absolute value of the coefficient level for the coefficient being encoded. In some examples, the amount of the variable increment may be determined based on a right shifted version of the absolute value of the coefficient level for the current coefficient where an amount of the right shift is based on the value of the Rice parameter. In some examples, entropy encoding unit 56 may use the updated value of the Rice parameter to define the Golomb codes for encoding a remaining absolute value of a coefficient level for a subsequent coefficient in the CG.

Figure 8:
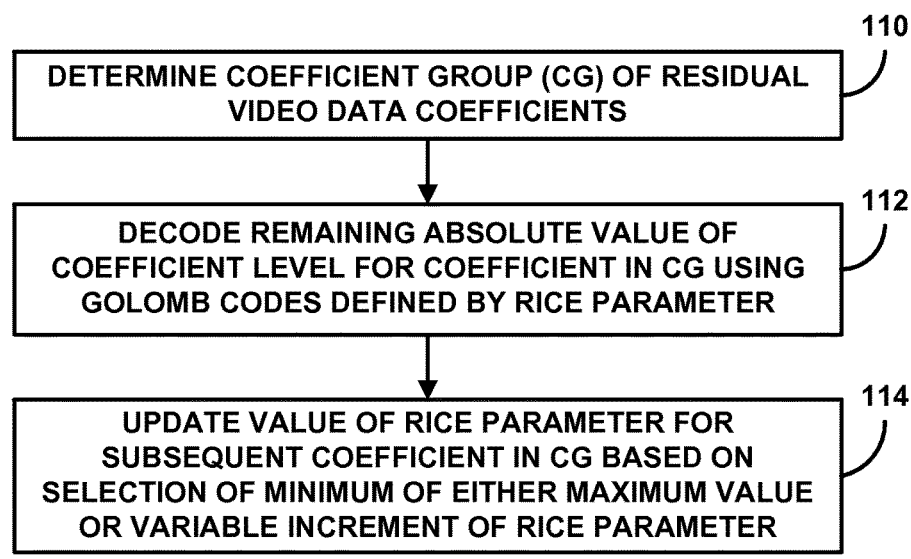
FIG. 8 is a flowchart illustrating an example operation of updating a value of a Rice parameter during entropy decoding of coefficient levels according to techniques described in this disclosure.

FIG. 8 is a flowchart illustrating an example operation of updating a value of a Rice parameter during entropy decoding of coefficient levels according to techniques described in this disclosure. The example operation is described with respect to video decoder 30 including entropy decoding unit 70 from FIG. 6.

Video decoder 30 receives an encoded video bitstream from video encoder 20 or from a storage device such as storage medium 34 or file server 36. The received video bistream represents coefficients of residual video data to be decoded. Upon receiving the video bitstream, entropy decoding unit 70 determines a block or coefficient group (CG) of residual video data coefficients to be decoded from the bitstream (110). The CG may be a subblock of a transform block, such as a 4×4 subblock as illustrated in FIG. 4.

As described above in more detail, entropy decoding unit 70 may perform one or more scans of the CG according to an inverse scan order to decode coefficient levels of the coefficients in the CG. For example, entropy decoding unit 70 may decode flags or syntax elements that indicate whether the coefficients have coefficient levels with absolute values are greater than 1 or greater than 2 using context models in a regular coding mode. Entropy decoding unit 70 also decodes a flag or a syntax element that indicates a remaining absolute value of a coefficient level for at least one of the coefficients in the CG using Golomb codes defined by a Rice parameter (112). For example, entropy decoding unit 70 may decode a syntax element indicating a remaining absolute value of a coefficient level for any of the coefficients with coefficient levels greater than 2 in bypass mode.

According to the techniques of this disclosure, entropy decoding unit 70 updates a value of the Rice parameter based on a selection of a minimum of either a maximum value of the Rice parameter or a variable increment of the value of the Rice parameter (114). As described in detail above, an amount of the variable increment is determined based on the value of the Rice parameter and an absolute value of the coefficient level for the coefficient being decoded. In some examples, the amount of the variable increment may be determined based on a right shifted version of the absolute value of the coefficient level for the current coefficient where an amount of the right shift is based on the value of the Rice parameter. In some examples, entropy decoding unit 70 may use the updated value of the Rice parameter to define the Golomb codes for decoding a remaining absolute value of a coefficient level for a subsequent coefficient in the CG.

Figure 9:
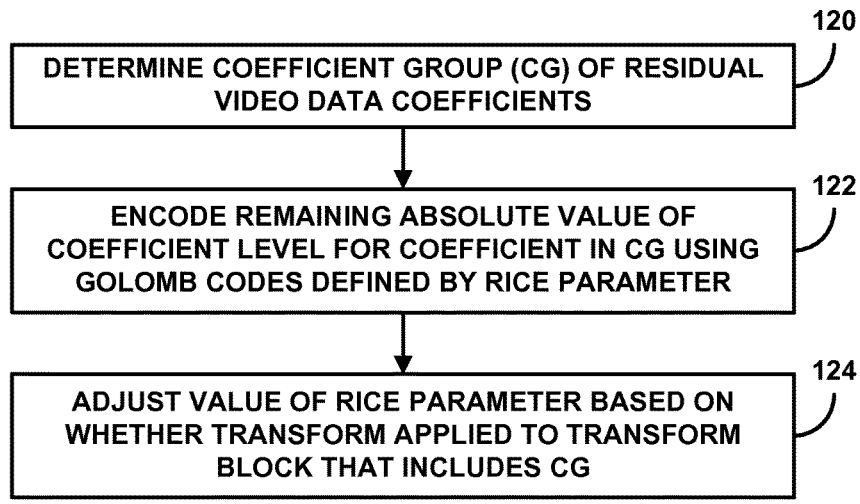
FIG. 9 is a flowchart illustrating an example operation of adjusting a value of a Rice parameter during entropy encoding of coefficient levels according to techniques described in this disclosure.

FIG. 9 is a flowchart illustrating an example operation of adjusting a value of a Rice parameter during entropy encoding of coefficient levels according to techniques described in this disclosure. The example operation is described with respect to video encoder 20 including entropy encoding unit 56 from FIG. 5.

Entropy encoding unit 56 receives coefficients of residual video data to be encoded into a bitstream for transmission to video decoder 30 or for storage on storage medium 34 or file server 36. Upon receiving the residual video data coefficients for encoding, entropy encoding unit 56 determines a block or coefficient group (CG) of the coefficients (120). The CG may be a subblock of a transform block, such as a 4×4 subblock as illustrated in FIG. 4. In the case of lossy video coding, the coefficients to be encoded may be quantized transform coefficients. In the case of lossless video coding and lossy video coding with transform skip or bypass, the transform and quantization operations are skipped for the coefficients to be encoded.

As described above in more detail, entropy encoding unit 56 may perform one or more scans of the CG according to an inverse scan order to encode coefficient levels of the coefficients in the CG. For example, entropy encoding unit 56 encodes a flag or a syntax element that indicates a remaining absolute value of a coefficient level for at least one of the coefficients in the CG using Golomb codes defined by a Rice parameter (122). According to the techniques of this disclosure, entropy encoding unit 56 adjusts a value of the Rice parameter based on whether a transform was applied to the transform block that includes the CG (124). Entropy encoding unit 56 may determine whether the transform is applied to the transform block based on at least one of a lossless coding status, a transform bypass status, a transform skip status, or a profile set in a parameter set for the transform block.

In one example, according to the techniques of this disclosure, if the transform is not applied to the transform block, the Rice parameter update scheme described in this disclosure may be used to update the value of the Rice parameter for coding remaining absolute values of coefficient levels for a subsequent coefficient in the CG. Otherwise, if the transform is applied to the transform block, the HEVC Rice parameter update scheme may be used to update the value of the Rice parameter for a subsequent coefficient in the CG. In another example, according to the techniques, if the transform is not applied to the transform block, the value of the Rice parameter may be initialized for a subsequent CG in the transform block based on the value of the Rice parameter after encoding the remaining absolute values of coefficient levels for the coefficients in the current CG. Otherwise, if the transform is applied to the transform block, the value of the Rice parameter may be initialized to be equal to zero for a subsequent CG in the transform block.

Figure 10:
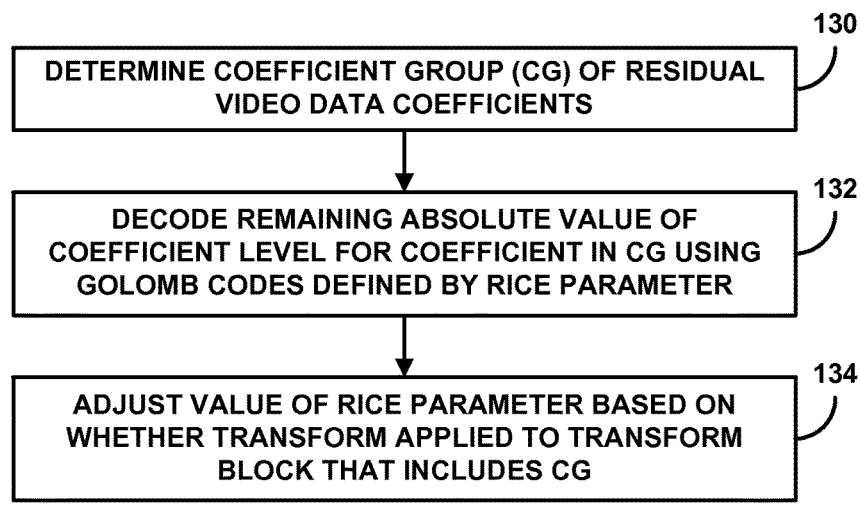
FIG. 10 is a flowchart illustrating an example operation of adjusting a value of a Rice parameter during entropy decoding of coefficient levels according to techniques described in this disclosure.

FIG. 10 is a flowchart illustrating an example operation of adjusting a value of a Rice parameter during entropy decoding of coefficient levels according to techniques described in this disclosure. The example operation is described with respect to video decoder 20 including entropy decoding unit 70 from FIG. 6.

Video decoder 30 receives an encoded video bitstream from video encoder 20 or from a storage device such as storage medium 34 or file server 36. The received video bistream represents coefficients of residual video data to be decoded. Upon receiving the video bitstream, entropy decoding unit 70 determines a block or coefficient group (CG) of residual video data coefficients to be decoded from the bitstream (130). The CG may be a subblock of a transform block, such as a 4×4 subblock as illustrated in FIG. 4. In the case of lossy video coding, the coefficients to be decoded may be quantized transform coefficients. In the case of lossless video coding and lossy video coding with transform skip or bypass, the transform and quantization operations are skipped for the coefficients to be decoded.

As described above in more detail, entropy decoding unit 70 may perform one or more scans of the CG according to an inverse scan order to decode coefficient levels of the coefficients in the CG. For example, entropy decoding unit 70 decodes a flag or a syntax element that indicates a remaining absolute value of a coefficient level for at least one of the coefficients in the CG using Golomb codes defined by a Rice parameter (132). According to the techniques of this disclosure, entropy decoding unit 70 adjusts a value of the Rice parameter based on whether a transform was applied to a transform block that includes the CG (134). Entropy decoding unit 70 may determine whether the transform is applied to the transform block based on at least one of a lossless coding status, a transform bypass status, a transform skip status, or a profile set in a parameter set for the transform block.

In one example, according to the techniques of this disclosure, if the transform is not applied to the transform block, the Rice parameter update scheme described in this disclosure may be used to update the value of the Rice parameter for coding remaining absolute values of coefficient levels for a subsequent coefficient in the CG. Otherwise, if the transform is applied to the transform block, the HEVC Rice parameter update scheme may be used to update the value of the Rice parameter for a subsequent coefficient in the CG. In another example, according to the techniques, if the transform is not applied to the transform block, the value of the Rice parameter may be initialized for a subsequent CG in the transform block based on the value of the Rice parameter after decoding the remaining absolute values of coefficient levels for the coefficients in the current CG. Otherwise, if the transform is applied to the transform block, the value of the Rice parameter may be initialized to be equal to zero for a subsequent CG in the transform block.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding coefficients in a video decoding process, the method comprising:
   determining a block of coefficients of residual video data;
   determining that a transform is not applied to a transform block that includes the block of coefficients, wherein the block of coefficients is a block of residual coefficients in a pixel domain;
   decoding an indication that a coefficient level for at least one of the coefficients in the block of coefficients has an absolute value greater than a given value using adaptive context models;
   decoding a remaining absolute value of the coefficient level for the at least one of the coefficients using Golomb codes defined by a Rice parameter, wherein the remaining absolute value of the coefficient level comprises an amount of the absolute value of the coefficient level that is greater than the given value;

after decoding the remaining absolute value of the coefficient level for the at least one of the coefficients, adjusting a value of the Rice parameter according to a first process based on the transform not being applied to the transform block that includes the block of coefficients, wherein the first process for adjusting the value of the Rice parameter based on the transform not being applied to the transform block is different than a second process for adjusting a value of a Rice parameter based on a transform being applied to a transform block; and decoding a remaining absolute value of a coefficient level for a subsequent coefficient using Golomb codes defined by the adjusted value of the Rice parameter.

2. The method of claim 1, wherein the block of coefficients comprises a coefficient group (CG) included in the transform block, and wherein adjusting the value of the Rice parameter according to the first process comprises updating the value of the Rice parameter for the subsequent coefficient in the CG, and wherein decoding the remaining absolute value of the coefficient level for the subsequent coefficient comprises decoding the remaining absolute value of the coefficient level for the subsequent coefficient in the CG using Golomb codes defined by the updated value of the Rice parameter.

3. The method of claim 1, wherein the block of coefficients comprises a coefficient group (CG) included in the transform block, and wherein adjusting the value of the Rice parameter according to the first process comprises initializing the value of the Rice parameter for a subsequent CG in the transform block, and wherein decoding the remaining absolute value of the coefficient level for the subsequent coefficient comprises decoding the remaining absolute value of the coefficient level for the subsequent coefficient in the subsequent CG using Golomb codes defined by the initialized value of the Rice parameter.

4. The method of claim 1, wherein adjusting the value of the Rice parameter according to the first process comprises, in response to the determination that the transform is not applied to the transform block that includes the block of coefficients, updating the value of the Rice parameter for the subsequent coefficient in the block of coefficients based on a selection of either a maximum value of the Rice parameter or a variable increment of the value of the Rice parameter, wherein the variable increment is determined based on the value of the Rice parameter and the absolute value of the coefficient level for the at least one of the coefficients.

5. The method of claim 4, wherein the variable increment increases the value of the Rice parameter by any integer value up to the maximum value of the Rice parameter.

6. The method of claim 4, wherein the variable increment is determined based on a right shifted version of the absolute value of the coefficient level for the at least one of the coefficients, and wherein an amount of the right shift is based on the value of the Rice parameter.

7. The method of claim 4, wherein an amount of the variable increment at each update of the value of the Rice parameter is one of scaled by a damping factor or capped to be less than or equal to a maximum increment value.

8. The method of claim 1, wherein adjusting the value of the Rice parameter according to the first process comprises, in response to the determination that the transform is not applied to the transform block that includes the block of coefficients, decreasing the value of the Rice parameter for the subsequent coefficient in the block of coefficients based on the value of the Rice parameter and the absolute value of the coefficient level for the at least one of the coefficients.

9. The method of claim 1, wherein adjusting the value of the Rice parameter according to the first process comprises, in response to the determination that the transform is not applied to the transform block that includes the block of coefficients, initializing the value of the Rice parameter for a subsequent block of coefficients in the transform block based on the value of the Rice parameter after decoding the remaining absolute value of the coefficient level for the at least one of the coefficients in the block of coefficients.

10. The method of claim 1, wherein determining that the transform is not applied to the transform block comprises determining at least one of a lossless coding status, a transform bypass status, a transform skip status, or a profile set in a parameter set for the transform block.

11. A method of encoding coefficients in a video encoding process, the method comprising:

determining a block of coefficients of residual video data;

determining that a transform is not applied to a transform block that includes the block of coefficients, wherein the block of coefficients is a block of residual coefficients in a pixel domain;

encoding an indication that a coefficient level for at least one of the coefficients in the block of coefficients has an absolute value greater than a given value using adaptive context models;

encoding a remaining absolute value of the coefficient level for the at least one of the coefficients using Golomb codes defined by a Rice parameter, wherein the remaining absolute value of the coefficient level comprises an amount of the absolute value of the coefficient level that is greater than the given value;

after encoding the remaining absolute value of the coefficient level for the at least one of the coefficients, adjusting a value of the Rice parameter according to a first process based on the transform not being applied to the transform block that includes the block of coefficients, wherein the first process for adjusting the value of the Rice parameter based on the transform not being applied to the transform block is different than a second process for adjusting a value of a Rice parameter based on a transform being applied to a transform block; and encoding a remaining absolute value of a coefficient level for a subsequent coefficient using Golomb codes defined by the adjusted value of the Rice parameter.

12. The method of claim 11, wherein the block of coefficients comprises a coefficient group (CG) included in the transform block, and wherein adjusting the value of the Rice parameter according to the first process comprises updating the value of the Rice parameter for the subsequent coefficient in the CG, and wherein encoding the remaining absolute value of the coefficient level for the subsequent coefficient comprises encoding the remaining absolute value of the coefficient level for the subsequent coefficient in the CG using Golomb codes defined by the updated value of the Rice parameter.

13. The method of claim 11, wherein the block of coefficients comprises a coefficient group (CG) included in the transform block, and wherein adjusting the value of the Rice parameter according to the first process comprises initializing the value of the Rice parameter for a subsequent CG in the transform block, and wherein encoding the remaining absolute value of the coefficient level for the subsequent coefficient comprises encoding the remaining absolute value of the coefficient level for the subsequent coefficient in the subsequent CG using Golomb codes defined by the initialized value of the Rice parameter.

14. The method of claim 11, wherein adjusting the value of the Rice parameter according to the first process comprises, in response to the determination that the transform is not applied to the transform block that includes the block of coefficients, updating the value of the Rice parameter for the subsequent coefficient in the block of coefficients based on a selection of a minimum of either a maximum value of the Rice parameter or a variable increment of the value of the Rice parameter, wherein the variable increment is determined based on the value of the Rice parameter and the absolute value of the coefficient level for the at least one of the coefficients.

15. The method of claim 14, wherein the variable increment increases the value of the Rice parameter by any integer value up to the maximum value of the Rice parameter.

16. The method of claim 14, wherein the variable increment is determined based on a right shifted version of the absolute value of the coefficient level for the at least one of the coefficients, and wherein an amount of the right shift is based on the value of the Rice parameter.

17. The method of claim 14, wherein an amount of the variable increment at each update of the value of the Rice parameter is one of scaled by a damping factor or capped to be less than or equal to a maximum increment value.

18. The method of claim 11, wherein adjusting the value of the Rice parameter according to the first process comprises, in response to the determination that the transform is not applied to the transform block that includes the block of coefficients, decreasing the value of the Rice parameter for the subsequent coefficient in the block of coefficients based on the value of the Rice parameter and the absolute value of the coefficient level for the coefficient being encoded.

19. The method of claim 11, wherein adjusting the value of the Rice parameter according to the first process comprises, in response to the determination that the transform is not applied to the transform block that includes the block of coefficients, initializing the value of the Rice parameter for a subsequent block of coefficients in the transform block based on the value of the Rice parameter after encoding the remaining absolute value of the coefficient level for the at least one of the coefficients in the block of coefficients.

20. The method of claim 11, wherein determining that the transform is not applied to the transform block comprises determining at least one of a lossless coding status, a transform bypass status, a transform skip status, or a profile set in a parameter set for the transform block.

21. A video coding device comprising:
a memory configured to store video data; and
one or more processors configured to:
determine a block of coefficients of residual video data;
determine that a transform is not applied to a transform block that includes the block of coefficients, wherein the block of coefficients is a block of residual coefficients in a pixel domain;
code an indication that a coefficient level for at least one of the coefficients in the block of coefficients has an absolute value greater than a given value using adaptive context models;
code a remaining absolute value of the coefficient level for the at least one of the coefficients using Golomb codes defined by a Rice parameter, wherein the remaining absolute value of the coefficient level comprises an amount of the absolute value of the coefficient level that is greater than the given value;
after coding the remaining absolute value of the coefficient level for the at least one of the coefficients, adjust a value of the Rice parameter according to a first process based on the transform not being applied to the transform block that includes the block of coefficients, wherein the first process for adjusting the value of the Rice parameter based on the transform not being applied to the transform block is different than a second process for adjusting a value of a Rice parameter based on a transform being applied to a transform block; and
code a remaining absolute value of a coefficient level for a subsequent coefficient using Golomb codes defined by the adjusted value of the Rice parameter.

22. The device of claim 21, wherein the video coding device comprises a video decoding device and the block of coefficients comprises a coefficient group (CG) included in the transform block, wherein the processors are configured to:
decode the remaining absolute value of the coefficient level for the at least one of the coefficients in the CG using the Golomb codes defined by the Rice parameter;
update the value of the Rice parameter based on the transform not being applied to the transform block that includes the CG; and
decode the remaining absolute value of the coefficient level for the subsequent coefficient in the CG using Golomb codes defined by the updated value of the Rice parameter.

23. The device of claim 21, wherein the video coding device comprises a video encoding device and the block of coefficients comprises a coefficient group (CG) included in the transform block, wherein the processors are configured to:
encode the remaining absolute value of the coefficient level for the at least one of the coefficients in the CG using the Golomb codes defined by the Rice parameter;
update the value of the Rice parameter based on the transform not being applied to the transform block that includes the CG; and
encode the remaining absolute value of the coefficient level for the subsequent coefficient in the CG using Golomb codes defined by the updated value of the Rice parameter.

24. The device of claim 21, wherein the video coding device comprises a video decoding device and the block of coefficients comprises a coefficient group (CG) included in the transform block, wherein the processors are configured to:
decode the remaining absolute value of the coefficient level for the at least one of the coefficients in the CG using the Golomb codes defined by the Rice parameter;
initialize the value of the Rice parameter for a subsequent CG in the transform block based on the transform not being applied to the transform block that includes the CG; and
decode the remaining absolute value of the coefficient level for the subsequent coefficient in the subsequent CG using Golomb codes defined by the initialized value of the Rice parameter.

25. The device of claim 21, wherein the video coding device comprises a video encoding device and the block of coefficients comprises a coefficient group (CG) included in the transform block, wherein the processors are configured to:

encode the remaining absolute value of the coefficient level for the at least one of the coefficients in the CG using the Golomb codes defined by the Rice parameter;

initialize the value of the Rice parameter for a subsequent CG in the transform block based on the transform not being applied to the transform block that includes the CG; and encode the remaining absolute value of the coefficient level for the subsequent coefficient in the subsequent CG using Golomb codes defined by the initialized value of the Rice parameter.

26. The device of claim 21, wherein the processors are configured to, in response to the determination that the transform is not applied to the transform block that includes the block of coefficients, update the value of the Rice parameter for the subsequent coefficient in the block of coefficients based on a selection of a minimum of either a maximum value of the Rice parameter or a variable increment of the value of the Rice parameter, wherein the variable increment is determined based on the value of the Rice parameter and the absolute value of the coefficient level for the at least one of the coefficients.

27. The device of claim 26, wherein the variable increment increases the value of the Rice parameter by any integer value up to the maximum value of the Rice parameter.

28. The device of claim 26, wherein the variable increment is determined based on a right shifted version of the absolute value of the coefficient level for the at least one of the coefficients, and wherein an amount of the right shift is based on the value of the Rice parameter.

29. The device of claim 26, wherein an amount of the variable increment at each update of the value of the Rice parameter is one of scaled by a damping factor or capped to be less than or equal to a maximum increment value.

30. The device of claim 21, wherein the processors are configured to, in response to the determination that the transform is not applied to the transform block that includes the block of coefficients, decrease the value of the Rice parameter based on the value of the Rice parameter and the absolute value of the coefficient level for the at least one of the coefficients.

31. The device of claim 21, wherein the processors are configured to, in response to the determination that the transform is not applied to the transform block that includes the block of coefficients, initialize the value of the Rice parameter for a subsequent block of coefficients in the transform block based on the value of the Rice parameter after coding the remaining absolute value of the coefficient level for the at least one of the coefficients in the block of coefficients.

32. The device of claim 21, wherein, to determine that the transform is not applied to the transform block, the processors are configured to determine at least one of a lossless coding status, a transform bypass status, a transform skip status, or a profile set in a parameter set for the transform block.

33. A video coding device comprising:

means for determining a block of coefficients of residual video data;

means for determining that a transform is not applied to a transform block that includes the block of coefficients, wherein the block of coefficients is a block of residual coefficients in a pixel domain;

means for coding an indication that a coefficient level for at least one of the coefficients in the block of coefficients has an absolute value greater than a given value using adaptive context models;

means for coding a remaining absolute value of the coefficient level for the at least one of the coefficients using Golomb codes defined by a Rice parameter, wherein the remaining absolute value of the coefficient level comprises an amount of the absolute value of the coefficient level that is greater than the given value;

means for, after coding the remaining absolute value of the coefficient level for the at least one of the coefficients, adjusting a value of the Rice parameter according to a first process based on the transform not being applied to the transform block that includes the block of coefficients, wherein the first process for adjusting the value of the Rice parameter based on the transform not being applied to the transform block is different than a second process for adjusting a value of a Rice parameter based on a transform being applied to a transform block; and means for coding a remaining absolute value of a coefficient level for a subsequent coefficient using Golomb codes defined by the adjusted value of the Rice parameter.

34. A non-transitory computer-readable storage medium comprising instructions that when executed by one or more processors of a video coding device cause the processors to:

determine a block of coefficients of residual video data;

determine that a transform is not applied to a transform block that includes the block of coefficients, wherein the block of coefficients is a block of residual coefficients in a pixel domain;

code an indication that a coefficient level for at least one of the coefficients in the block of coefficients has an absolute value greater than a given value using adaptive context models;

code a remaining absolute value of the coefficient level for the at least one of the coefficients using Golomb codes defined by a Rice parameter, wherein the remaining absolute value of the coefficient level comprises an amount of the absolute value of the coefficient level that is greater than the given value;

after coding the remaining absolute value of the coefficient level for the at least one of the coefficients, adjust a value of the Rice parameter according to a first process based on the transform not being applied to the transform block that includes the block of coefficients, wherein the first process for adjusting the value of the Rice parameter based on the transform not being applied to the transform block is different than a second process for adjusting a value of a Rice parameter based on a transform being applied to a transform block; and code a remaining absolute value of a coefficient level for a subsequent coefficient using Golomb codes defined by the adjusted value of the Rice parameter.

* * * * *